(12) United States Patent
Gassho et al.

(10) Patent No.: US 7,180,626 B1
(45) Date of Patent: Feb. 20, 2007

(54) PRINTER SYSTEM, PRINTER CONTROL METHOD, AND RECORDING MEDIUM

(75) Inventors: Kazuhito Gassho, Nagano-ken (JP); Hiroaki Sekizawa, Nagano-ken (JP); Haruo Tsurumaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 988 days.

(21) Appl. No.: 09/889,295

(22) PCT Filed: Nov. 16, 2000

(86) PCT No.: PCT/JP00/08106

§ 371 (c)(1),
(2), (4) Date: Aug. 21, 2001

(87) PCT Pub. No.: WO01/37075

PCT Pub. Date: May 25, 2001

(30) Foreign Application Priority Data

Nov. 16, 1999 (JP) ................................ 11-325199

(51) Int. Cl.
*G06F 15/00* (2006.01)
*G06K 1/00* (2006.01)

(52) U.S. Cl. ................. 358/1.6; 358/1.14; 358/1.15; 358/1.16; 358/296; 399/8; 718/100

(58) Field of Classification Search ............. 358/1.15, 358/1.14, 1.16, 296, 1.6; 718/100; 399/8
See application file for complete search history.

(56) References Cited

U.S. PATENT DOCUMENTS

| | | | | |
|---|---|---|---|---|
| 5,630,062 A | * | 5/1997 | Okutsu ................... | 718/100 |
| 5,689,755 A | * | 11/1997 | Ataka ..................... | 399/8 |
| 5,802,260 A | * | 9/1998 | Shimakawa et al. ....... | 358/1.15 |
| 5,812,747 A | * | 9/1998 | Kayano et al. ........... | 358/1.15 |
| 5,905,852 A | * | 5/1999 | Love et al. .............. | 358/1.15 |
| 6,031,631 A | * | 2/2000 | Tahara et al. ............ | 358/296 |
| 6,373,585 B1 | * | 4/2002 | Mastie et al. ............ | 358/1.15 |
| 6,498,656 B1 | * | 12/2002 | Mastie et al. ............ | 358/1.15 |
| 6,577,407 B1 | * | 6/2003 | Kopecki ................. | 358/1.15 |
| 6,606,164 B1 | * | 8/2003 | Irie et al. ............... | 358/1.15 |

(Continued)

FOREIGN PATENT DOCUMENTS

EP   0 855 640   7/1998

(Continued)

*Primary Examiner*—Kimberly Williams
*Assistant Examiner*—Satwant Singh
(74) *Attorney, Agent, or Firm*—Oblon, Spivak, McClelland, Maier & Neustadt, P.C.

(57) ABSTRACT

The technique of the present invention enables quick completion of printing operations even when a large number of print jobs are concentrated on one printer. A print load distribution apparatus 80 monitors the job status in a buffer 55 and the error status of a printing mechanism 51 in a range of preset three computers 50, 60, and 70 among a plurality of computers connected to a computer network. When a number of print jobs are concentrated on one printer (for example, the printer 50) or when one printer (50) is in the error status, the print load distribution apparatus 80 takes in at least one print job stored in the spooling buffer 55 of the corresponding printer (50) and transfers the at least one print job to another printer (60 or 70) in the range of preset three computers 50, 60, and 70.

37 Claims, 14 Drawing Sheets

U.S. PATENT DOCUMENTS 6,687,018 B1 * 2/2004 Leong et al. ............... 358/1.15
6,825,943 B1 * 11/2004 Barry et al. ............... 358/1.15
6,850,335 B1 * 2/2005 Barry et al. ............... 358/1.15
6,862,103 B1 * 3/2005 Miura et al. ............... 358/1.15
7,116,444 B2 * 10/2006 Barry et al. ................ 358/1.9

FOREIGN PATENT DOCUMENTS

| EP | 8 893 754 | 1/1999 |
|---|---|---|
| EP | 0 996 055 | 4/2000 |
| JP | 7-200203 | 8/1995 |
| JP | 8-63304 | 3/1996 |
| JP | 11-203078 | 7/1999 |
| JP | 11-282646 | 10/1999 |

* cited by examiner

PRINTER SYSTEM, PRINTER CONTROL METHOD, AND RECORDING MEDIUM

TECHNICAL FIELD

The present invention relates to a printing system where a plurality of printing apparatuses, each including a printing mechanism and a spool buffer, and at least one information processing apparatus outputting a print job are mutually connected. The present invention also pertains to a printing control method related to the printing system, as well as a recording medium.

BACKGROUND ART

A known technique of sharing printers mutually connects a plurality of client personal computers and a plurality of printers via a network. One example of such configuration provides each printer with an internal or external print server. This allows connection of the respective printers to the network via their print servers. Each of the print servers supports the spool function to process print jobs output from multiple client personal computers. The print server takes advantage of the spool function and successively outputs the stored print jobs to the corresponding printer, which carries out printing in response to each print job.

In the event that a number of print jobs output from a plurality of client personal computers are sent to one printer in a concentrated manner, the prior art technique requires a long time to start printing with regard to a print job at the end of the long queue and thus delays completion of printing.

The object of the present invention is thus to complete printing as quickly as possible even when a number of print jobs are concentrated on one printer.

DISCLOSURE OF THE INVENTION

The present invention adopts the following arrangement, in order to attain at least part of the above and the other related objects.

The present invention is accordingly directed to a first printing system that includes a plurality of printing apparatuses, each having a printing mechanism and a buffer for spooling assigned to the printing mechanism, and at least one information processing apparatus outputting print jobs, which are connected mutually. Each of the print jobs is sent from the information processing apparatus to the buffer included in any of the plurality of printing apparatuses and is printed by the printing mechanism by utilizing the spooling function of the printing apparatus. The first printing system further includes: a source apparatus specification unit that specifies a source printing apparatus, which entrusts at least one print job stored in its own buffer to another printing apparatus, in a preset range of printing apparatuses; and a job transfer unit that transfers the at least one print job stored in the buffer provided in the source printing apparatus specified by the source apparatus specification unit to the buffer of another printing apparatus in the preset range of printing apparatuses.

In the first printing system of the above configuration, the source printing apparatus, which should entrust the at least one print job stored in its own buffer to another printing apparatus, is specified by the source apparatus specification unit in the preset range of printing apparatuses among the plurality of printing apparatuses. The at least one print job stored in the buffer provided in the specified source printing apparatus is transferred to the buffer of another printing apparatus in the preset range of printing apparatuses.

The at least one print job stored in the buffer of the source printing apparatus can thus be transferred automatically to another printing apparatus, which is included in the preset range of printing apparatuses among the plurality of printing apparatuses, according to the requirements. When there is a significant delay of printing operation in response to a print job in a certain printing apparatus, this arrangement enables the printing operation to be carried out by another available printing apparatus. This desirably ensures quick completion of the printing operation.

In accordance with one preferable application of the first printing system, the source apparatus specification unit includes: a first information acquisition unit that obtains first information representing a congestion status of print jobs in the buffer of each printing apparatus, which is included in the preset range of printing apparatuses among the plurality of printing apparatuses; and a unit that detects a printing apparatus having a long queue of the print jobs based on the first information obtained by the first information acquisition unit, and specifies the detected printing apparatus as the source printing apparatus.

In the event that many print jobs from a number of information processing apparatuses are concentrated on one printing apparatus, the printing apparatus is expected to have a significantly long queue of print jobs. The at least one print job stored in the buffer provided in the printing apparatus is thus transferred to another printing apparatus. Even when a large number of print jobs are concentrated on one printing apparatus, this arrangement enables printing operation to be carried out by another available printer, thus ensuring quick completion of the printing operation.

In the application of specifying the source printing apparatus in the above manner, it is preferable that the printing system further includes a selection unit that selects a printing apparatus having a sufficiently short queue of print jobs in the preset range of printing apparatuses, based on the first information obtained by the first information acquisition unit. Here the job transfer unit sets the printing apparatus selected by the selection unit to a destination of the transfer of the print job.

This arrangement sets the printing apparatus having a sufficiently short queue of print jobs to the destination of the transfer of the print job, thus effectively utilizing the available printing apparatus and ensuring quicker completion of the printing operation.

In the first printing system having the configuration discussed above, the source apparatus specification unit may have: a second information acquisition unit that obtains second information representing a status of the printing mechanism of each printing apparatus in the preset range of printing apparatuses; and a unit that detects a printing apparatus having the printing mechanism in an error status based on the second information obtained by the second information acquisition unit, and specifies the detected printing apparatus as the source printing apparatus.

When the printing mechanism falls into an error status in the printing apparatus that receives output of a print job, this printing apparatus is detected by the source apparatus specification unit. The job transfer unit then transfers the at least one print job stored in the buffer provided in the specified source printing apparatus to another printing apparatus.

In the case where a print job is sent to the printing apparatus in the error status, this arrangement enables printing operation in response to the print job to be carried out by another available printing apparatus, thus ensuring quick completion of the printing operation. The error status of the printing mechanism is caused by, for example, failure of the printing mechanism, paper jam, or out of paper.

In the application of specifying the source printing apparatus in the above manner, it is preferable that the printing system further includes a selection unit that selects a printing apparatus having the printing mechanism not in the error status in the preset range of printing apparatuses, based on the second information obtained by the second information acquisition unit. Here the job transfer unit sets the printing apparatus selected by the selection unit to a destination of the transfer of the print job.

This arrangement sets the printing apparatus having the printing mechanism that is not in the error status to the destination of the transfer of the print job. The printing mechanism that is incapable of printing is thus not actuated for printing in vain, which may cause a delay of the printing operation.

In accordance with another preferable application of the first printing system, each print job output from the information processing apparatus has first label data representing whether or not the print job is a possible candidate for the transfer by the job transfer unit, and the job transfer unit has a transfer prohibition unit that prohibits the transfer of a print job that has been determined not to be a possible candidate for the transfer based on the first label data.

In the case where the operator desires a specific printing apparatus to carry out a printing operation in response to a certain print job, this arrangement desirably prevents the certain print job from being transferred to another printing apparatus.

In accordance with still another preferable application of the first printing system, each print job output from the information processing apparatus has second label data representing a priority order of printing by the spooling function, and the job transfer unit selects the at least one print job to be transferred, based on the second label data.

This arrangement causes a print job having the higher priority of printing to be preferentially transferred to another printing apparatus.

In accordance with one preferable embodiment of the present invention, the first printing system further includes: a job transfer information unit that informs the information processing apparatus, which is the output source of the at least one print job to be transferred by the job transfer unit, of the another printing apparatus specified as a destination of the transfer of the print job.

The operator is accordingly notified which printing apparatus is used for printing as the result of the transfer of the print job. This arrangement enhances the convenience of the operator.

The present invention is also directed to a second printing system having a plurality of apparatus groups. Each apparatus group includes a plurality of printing apparatuses, each having a printing mechanism and a buffer for spooling assigned to the printing mechanism, and at least one information processing apparatus outputting print jobs, which are connected mutually. Each of the print jobs is sent from the information processing apparatus to the buffer included in any of the plurality of printing apparatuses and is printed by the printing mechanism by utilizing the spooling function of the printing apparatus. The second printing system further includes: a source apparatus specification unit that specifies a source printing apparatus, which entrusts at least one print job stored in its own buffer to another printing apparatus, in a range of one certain apparatus group; and a job transfer unit that transfers the at least one print job stored in the buffer provided in the source printing apparatus specified by the source apparatus specification unit to the buffer of another printing apparatus in a range of at least two apparatus groups, which includes at least the certain apparatus group to which the source printing apparatus belongs.

In the second printing system of the above configuration, the source printing apparatus, which should entrust the at least one print job stored in its own buffer to another printing apparatus, is specified by the source apparatus specification unit in the range of an arbitrary apparatus group among the plurality of apparatus groups. The at least one print job stored in the buffer provided in the specified source printing apparatus is transferred to the buffer of another printing apparatus in the range of at least two apparatus groups, which includes at least the arbitrary apparatus group to which the source printing apparatus belongs.

The at least one print job stored in the buffer of the source printing apparatus belonging to a certain apparatus group can thus be transferred automatically to another printing apparatus belonging to the certain apparatus group or another apparatus group, according to the requirements. When there is a significant delay of printing operation in response to a print job in a certain printing apparatus, this arrangement finds another available printing apparatus in a wide range exceeding its own apparatus group and entrusts the another available printing apparatus with the printing operation in response to the print job. This desirably ensures quick completion of the printing operation.

In accordance with one preferable application of the second printing system, the source apparatus specification unit includes: a first information acquisition unit that obtains first information representing a congestion status of print jobs in the buffer of each printing apparatus in the range of the certain apparatus group; and a unit that detects a printing apparatus having a long queue of the print jobs based on the first information obtained by the first information acquisition unit, and specifies the detected printing apparatus as the source printing apparatus.

In the event that many print jobs from a number of information processing apparatuses are concentrated on one printing apparatus, the printing apparatus is expected to have a significantly long queue of print jobs. The at least one print job stored in the buffer provided in the printing apparatus is thus transferred to another printing apparatus. Even when a large number of print jobs are concentrated on one printing apparatus, this arrangement enables printing operation to be carried out by another available printer, thus ensuring quick completion of the printing operation.

In the application of specifying the source printing apparatus in the above manner, it is preferable that the printing system further includes: a target apparatus group specification unit that specifies a plurality of target apparatus groups as potential destinations of the transfer by the job transfer unit; an acquisition unit that obtains the first information in a range of the plurality of specified target apparatus groups; and a selection unit that selects a printing apparatus having a sufficiently short queue of print jobs in the range of the plurality of specified target apparatus groups, based on the first information obtained by the acquisition unit. Here the job transfer unit sets the printing apparatus selected by the selection unit to a destination of the transfer of the print job.

This arrangement sets the printing apparatus having a sufficiently short queue of print jobs to the destination of the transfer of the print job, thus effectively utilizing the available printing apparatus and ensuring quicker completion of the printing operation.

In the second printing system having the configuration discussed above, the source apparatus specification unit may have: a second information acquisition unit that obtains second information representing a status of the printing mechanism of each printing apparatus in the range of the certain apparatus group; and a unit that detects a printing apparatus having the printing mechanism in an error status based on the second information obtained by the second information acquisition unit, and specifies the detected printing apparatus as the source printing apparatus.

When the printing mechanism falls into an error status in the printing apparatus that receives output of a print job, this printing apparatus is detected by the source apparatus specification unit. The job transfer unit then transfers the at least one print job stored in the buffer provided in the specified source printing apparatus to another printing apparatus.

In the case where a print job is sent to the printing apparatus in the error status, this arrangement enables printing operation in response to the print job to be carried out by another available printing apparatus, thus ensuring quick completion of the printing operation. The error status of the printing mechanism is caused by, for example, failure of the printing mechanism, paper jam, or out of paper.

In the application of specifying the source printing apparatus in the above manner, it is preferable that the printing system further includes: a target apparatus group specification unit that specifies a plurality of target apparatus groups as potential destinations of the transfer by said job transfer unit; an acquisition unit that obtains the second information in a range of the plurality of specified target apparatus groups; and a selection unit that selects a printing apparatus having the printing mechanism not in the error status in the range of the plurality of specified target apparatus groups, based on the second information obtained by the acquisition unit. Here the job transfer unit sets the printing apparatus selected by the selection unit to a destination of the transfer of the print job.

This arrangement sets the printing apparatus having the printing mechanism that is not in the error status to the destination of the transfer of the print job. The printing mechanism that is incapable of printing is thus not actuated for printing in vain, which may cause a delay of the printing operation.

In accordance with one preferable embodiment of the present invention, the second printing system further includes: a target apparatus group specification unit that specifies a plurality of target apparatus groups as potential destinations of the transfer by said job transfer unit; a detection unit that detects an available printing apparatus as a possible candidate for destination of the transfer by the job transfer unit in each of the plurality of target apparatus groups specified; a management unit that collects all the available printing apparatuses in the respective target apparatus groups detected by the detection unit and stores a result of the collection as management data; and a selection unit that selects one printing apparatus as a destination printing apparatus for the transfer by the job transfer unit, based on the management data.

In the procedure of this embodiment, one available printing apparatus is detected as a possible candidate for destination of the transfer in each of the plurality of target apparatus groups specified as potential destinations of the job transfer. The procedure then collects all the available printing apparatuses in the respective target apparatus groups and selects one printing apparatus as a destination printing apparatus for the job transfer. This arrangement facilitates the proper selection of the destination of the job transfer.

In the printing system of the above embodiment, each of the plurality of target apparatus groups specified by the target apparatus group specification unit has the management unit, and specific data including at least the available printing apparatuses in the respective target apparatus groups detected by the detection unit are transmitted between the plurality of target apparatus groups specified by the target apparatus group specification unit, so that the total data is common to the plurality of target apparatus groups.

This arrangement enables the destination of the job transfer to be properly selected among all the plurality of target apparatus groups specified as the potential destinations of the job transfer.

In the printing system of the above embodiment, the management unit is provided separately from the plurality of target apparatus groups specified by the target apparatus group specification unit and is actualized by a computer connected to each target apparatus group via communication.

In this arrangement, the computer in the upper level manages the information processing apparatus included in each target apparatus group. This arrangement ensures the proper selection of the destination of the job transfer.

In either one of the first printing system and the second printing system discussed above, the each printing apparatus may further include: a receiver unit that receives an external print job; an identification unit that carries out identification to determine whether or not the external print job received by the receiver unit has been sent via the job transfer unit; and a processing change unit that changes over a series of processing to be executed, based on a result of the identification by the identification unit.

This application changes over the series of processing to be executed, whether an external print job input into a printing apparatus has been sent from another printing apparatus via the job transfer unit or has been sent from any information processing apparatus not via the job transfer unit but directly. This arrangement enables different series of processing to be executed for different transmission sources of print jobs.

In the printing system of the above application, the each printing apparatus may further include an authentication unit that authenticates a source of transmission of the print job. Here the processing change unit has a unit that switches over a working status of the authentication unit between execution and non-execution.

In this arrangement, print jobs sent from other printing apparatuses are not subjected to the authentication of the transmission source, whereas print jobs directly sent from any information processing apparatus are subjected to the authentication of the transmission source. It is expected that the print jobs sent from the other printing apparatuses have already undergone the authentication at the time of transmission to the other printing apparatuses. The process of the authentication can thus be omitted.

In accordance with another aspect, the present invention provides a first printing control method adopted in a printing system that includes a plurality of printing apparatuses, each having a printing mechanism and a buffer for spooling assigned to the printing mechanism, and at least one information processing apparatus outputting print jobs, which are connected mutually. Each of the print jobs is sent from the information processing apparatus to the buffer included in any of the plurality of printing apparatuses and is printed by the printing mechanism by utilizing the spooling function of the printing apparatus. The first printing control method includes the steps of: (a) specifying a source printing apparatus, which entrusts at least one print job stored in its own buffer to another printing apparatus, in a preset range of printing apparatuses; and (b) transferring the at least one print job stored in the buffer provided in the source printing apparatus specified in the step (a) to the buffer of another printing apparatus in the preset range of printing apparatuses.

The present invention is also directed to a second printing control method adopted in a printing system, which has a plurality of apparatus groups. Each apparatus group includes a plurality of printing apparatuses, each having a printing mechanism and a buffer for spooling assigned to the printing mechanism, and at least one information processing apparatus outputting print jobs, which are connected mutually. Each of the print jobs is sent from the information processing apparatus to the buffer included in any of the plurality of printing apparatuses and is printed by the printing mechanism by utilizing the spooling function of the printing apparatus. The second printing control method includes the steps of (a) specifying a source printing apparatus, which entrusts at least one print job stored in its own buffer to another printing apparatus, in a range of one certain apparatus group; and (b) transferring the at least one print job stored in the buffer provided in the source printing apparatus specified in the step (a) to the buffer of another printing apparatus in a range of at least two apparatus groups, which includes at least the certain apparatus group to which the source printing apparatus belongs.

The first printing control method and the second printing control method of the present invention exert the same functions and the effects as those of the first printing system and the second printing system discussed above. When there is a delay of printing operation in response to a print job in a certain printer, the arrangement enables quick completion of the printing operation.

In accordance with still another aspect, the present invention provides a first computer readable recording medium in which a computer program is recorded. The computer program is adopted in a printing system that includes a plurality of printing apparatuses, each having a printing mechanism and a buffer for spooling assigned to the printing mechanism, and at least one information processing apparatus outputting print jobs, which are connected mutually. Each of the print jobs is sent from the information processing apparatus to the buffer included in any of the plurality of printing apparatuses and is printed by the printing mechanism by utilizing the spooling function of the printing apparatus. The computer program causes a computer to attain the functions of: (a) specifying a source printing apparatus, which entrusts at least one print job stored in its own buffer to another printing apparatus, in a preset range of printing apparatuses; and (b) transferring the at least one print job stored in the buffer provided in the source printing apparatus specified by the function (a) to the buffer of another printing apparatus in the preset range of printing apparatuses.

The present invention is also directed to a second computer readable recording medium in which a computer program is recorded. The computer program is adopted in a printing system having a plurality of apparatus groups. Each apparatus group includes a plurality of printing apparatuses, each having a printing mechanism and a buffer for spooling assigned to the printing mechanism, and at least one information processing apparatus outputting print jobs, which are connected mutually. Each of the print jobs is sent from the information processing apparatus to the buffer included in any of the plurality of printing apparatuses and is printed by the printing mechanism by utilizing the spooling function of the printing apparatus. The computer program causes a computer to attain the functions of: (a) specifying a source printing apparatus, which entrusts at least one print job stored in its own buffer to another printing apparatus, in a range of one certain apparatus group; and (b) transferring the at least one print job stored in the buffer provided in the source printing apparatus specified by the function (a) to the buffer of another printing apparatus in a range of at least two apparatus groups, which includes at least the certain apparatus group to which the source printing apparatus belongs.

The first recording medium and the second recording medium of the present invention exert the same functions and the effects as those of the first printing system and the second printing system discussed above. When there is a delay of printing operation in response to a print job in a certain printer, the arrangement enables quick completion of the printing operation.

The principle of the present invention may be attained by a variety of other applications. A first application is computer programs having the same functions as those of the recording media of the present invention. A second application is data signals that include such computer programs and are embodied in carrier waves. A third application is a program supply apparatus that supplies such computer programs via a communication path. In the third application, for example, a variety of computer programs may be stored in a server on a network. Required programs are downloaded to the computer via the communication path and are executed to attain any of the methods and the systems discussed above.

BEST MODES OF CARRYING OUT THE INVENTION

Figure 1:
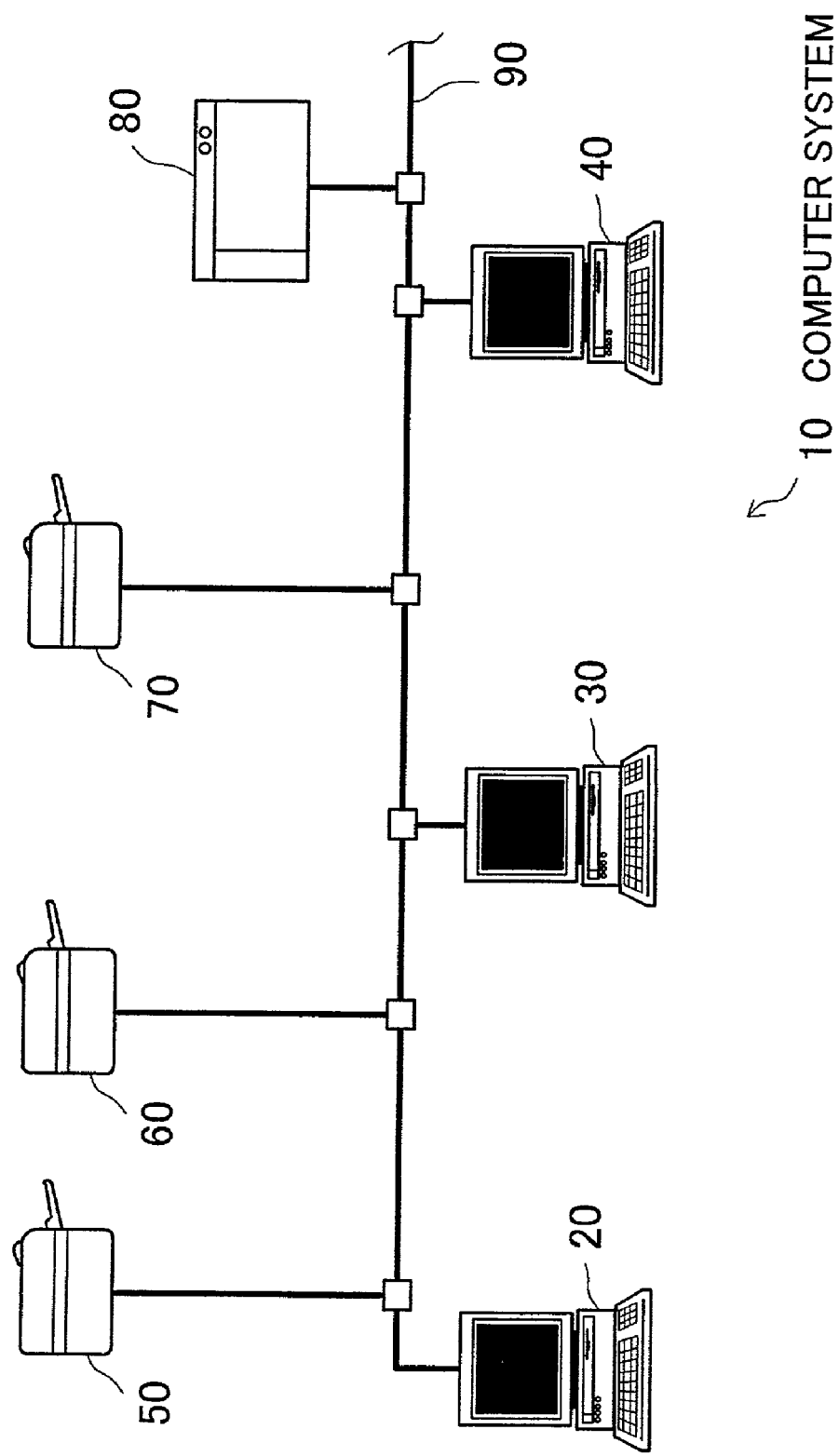
FIG. 1 schematically illustrates the configuration of a computer system in a first embodiment of the present invention.

In order to further clarify the configurations, functions, features, and advantages of the present invention, some modes of carrying out the present invention are discussed below as preferred embodiments. FIG. 1 schematically illustrates the configuration of a computer system in a first embodiment of the present invention.

As illustrated in FIG. 1, a computer system 10 of this embodiment includes a plurality of (three in the illustration of FIG. 1) personal computers (hereinafter referred to as client PCs) 20, 30, and 40 that respectively output print jobs, a plurality of (three in the illustration of FIG. 1) printers 50, 60, and 70 that carry out printing operations in response to the print jobs, and a print load distribution apparatus 80 that distribute the print load of the printers 50 to 70, which are mutually connected via a computer network 90 constructed as a Local Area Network (LAN). The computer network 90 is, however, not restricted to the LAN but may be any of diverse networks, for example, the Internet, an Intranet, or a Wide Area Network (WAN).

Each print job is a set of data representing one printed matter and includes image data and control data. The print job also includes sender information for identifying the client PC that is the output source of the print job. The sender information may be a sender ID for identifying the client PC or may alternatively be a user account name to ask the network a use permission. In the network environment, one user may simultaneously use multiple client PCs. In such cases, identification is required not for the client PC but rather for the user. The print job may thus include the user account name as the sender information.

Each of the client PCs 20 through 40 is a known personal computer that is provided with a CRT display, a keyboard, and a mouse as peripheral equipment. Each of the printers 50 to 70 substantially possesses the functions of the computer and is a laser printer that creates an image on a drum with a laser, adheres toner to the image, and transfers the toner image to paper. The printers 50 to 70 have the spool function and correspond to the printing apparatuses of the present invention. Any of various printers are applicable for the printers 50 to 70; for example, ink jet printers and thermal transfer printers. The print load distribution apparatus 80 also substantially possesses the functions of the computer.

Figure 2:
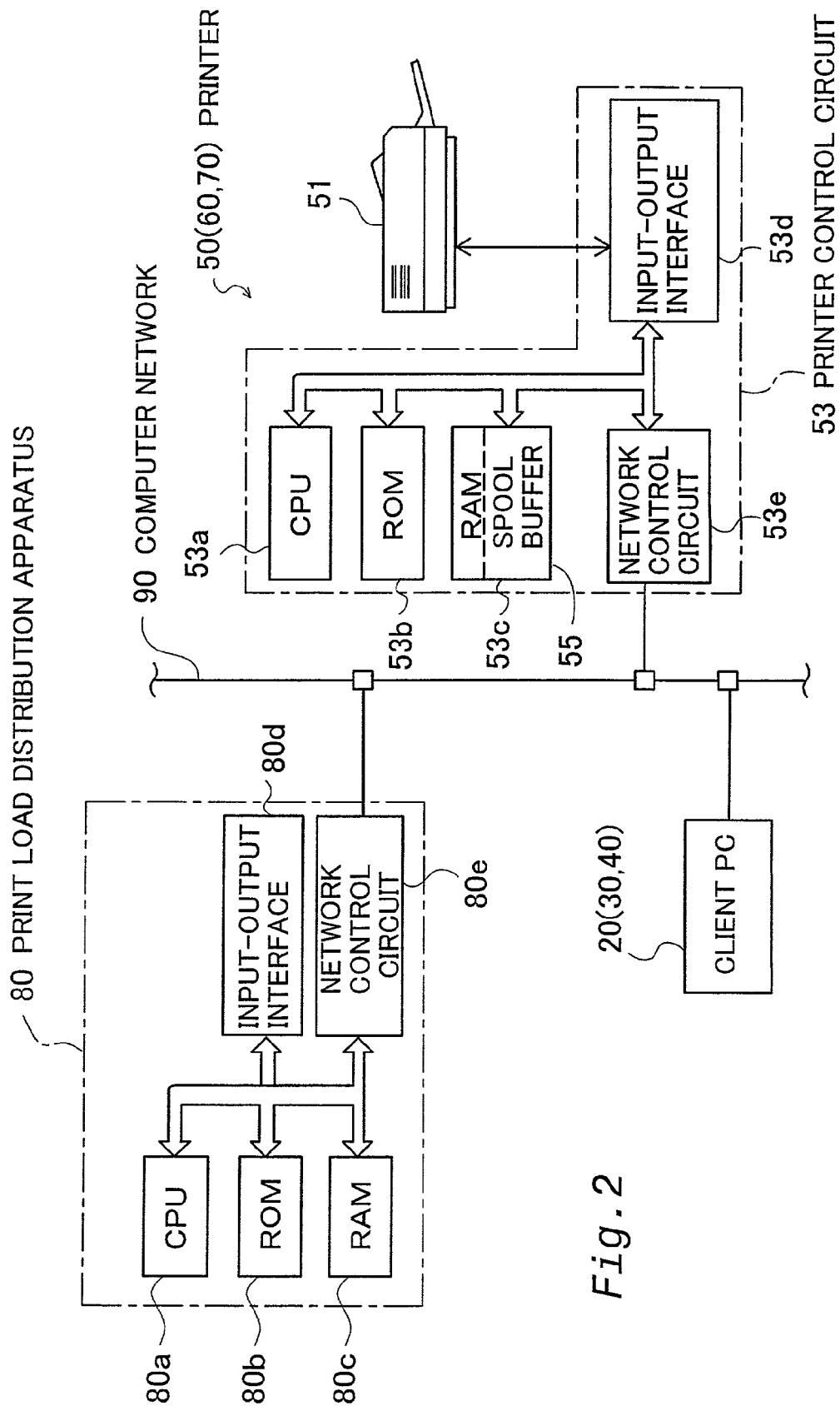
FIG. 2 is a block diagram showing the internal hardware construction of printers 50 to 70 and a print load distribution apparatus 80.

FIG. 2 is a block diagram showing the internal hardware construction of the printers 50 to 70 and the print load distribution apparatus 80. Each of the printers 50 to 70 has a printing mechanism 51 and a printer control circuit 53. The printer control circuit 53 includes a CPU 53a as a central processing unit, a ROM 53b, a RAM 53c, an input-output interface 53d, and a network control circuit 53e, which are mutually connected via a bus. The ROM 53b is a read only memory in which a variety of internal computer programs are stored. The RAM 53c is a readable and writable memory, which a diversity of data are written in and read from. A spool buffer 55 is constructed in the RAM 53c. The input-output interface 53d outputs control data to the printing mechanism 51 to control printing operations. The network control circuit 53e is connected to the computer network 90.

The print load distribution apparatus 80 includes a CPU 80a as a central processing unit, a ROM 80b, a RAM 80c, an input-output interface 80d, and a network control circuit 80e. The ROM 80b is a read only memory in which a variety of internal computer programs are stored. The RAM 80c is a readable and writable memory, which a diversity of data are written in and read from. The input-output interface transmits data to and from non-illustrated peripheral equipment. The network control circuit 80e is connected to the computer network 90. The hardware construction of the client PCs 20 to 40 is known and is not specifically described here.

In the computer system 10 of the above configuration, print jobs are sent from any of the client PCs 20, 30, and 40 to the printer control circuit 53 included in any of the printers 50, 60, and 70 via the network 90. When a large number of print jobs are sent from the plurality of client PCs 20, 30, and 40 to one printer 50 (60 or 70) in a concentrated manner and there is a long queue of the print jobs in the printer 50 (60 or 70), the print load distribution apparatus 80 transfers at least one print job in the queue to the printer control circuit 53 of another printer 60 or 70 (50) having a spare capacity.

Figure 3:
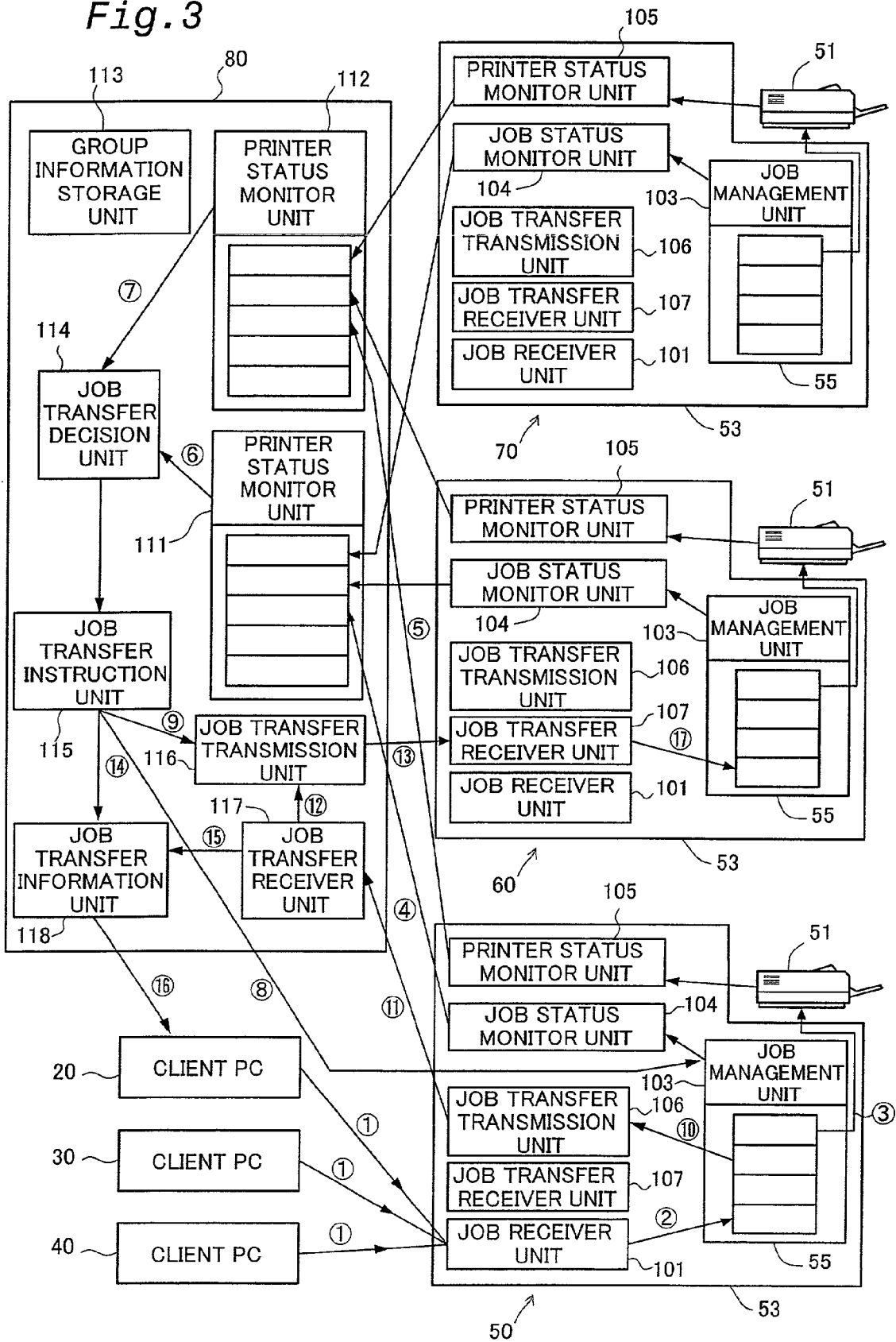
FIG. 3 is a block diagram showing details of the processing executed by printer control circuits 53 of the respective printers 50 to 70 and the print load distribution apparatus 80.

The following describes the details of this processing. FIG. 3 is a block diagram showing details of the processing executed by the printer control circuits 53 of the respective printers 50 to 70 and the print load distribution apparatus 80. When a print job is sent from any of the client PCs 20, 30, and 40 to an arbitrary printer (the printer 50 in the illustrated example), a job receiver unit 101 provided in the printer control circuit 53 of the printer 50, which is the destination of the print job, receives the print job [1]. In the printer control circuit 53, the print job received by the job receiver unit 101 is temporarily stored in the spool buffer 55 [2]. A job management unit 103 sequentially outputs the print jobs stored in the buffer 55 to the printing mechanism 51 [3]. The printing mechanism 51 then prints an image in response to each of the print jobs.

The printer control circuit 53 also has a job status monitor unit 104 and a printer status monitor unit 105. The job status monitor unit 104 monitors the congestion status of the print jobs stored in the buffer 55, based on the information transmitted from the job management unit 103. The printer status monitor unit 105 monitors the working status of the printing mechanism 51, based on the information transmitted from the printing mechanism 51. The monitoring results with regard to the respective printers 50, 60, and 70 obtained by the job status monitor unit 104 and the printer status monitor unit 105 are transferred to the print load distribution apparatus 80 [4] and [5].

In the print load distribution apparatus 80, a job status monitor unit 111 stores the monitoring results of the job status transmitted from the respective printers 50, 60, and 70 and monitors the congestion status of the print jobs stored in each buffer 55. A printer status monitor unit 112 stores the monitoring results of the printer status transmitted from the respective printers 50, 60, and 70 and monitors the working status of each printing mechanism 51. In the above discussion, it is explained that the print load distribution apparatus 80 monitors the printer status and the job status with regard to the three printers 50, 60, and 70 among the plurality of printers connected to the computer network 90. In the actual operations, however, printer IDs for identifying the respective printers of interest, which are the objects to be monitored, have been stored in advance in a group information storage unit 113 included in the print load distribution apparatus 80. (In this embodiment, printer IDs of the three printers 50, 60, and 70 have been stored). The print load distribution unit 80 refers to the printer IDs and monitors the printer status and the job status of any desired printer. The printer IDs may be replaced by any piece of information for identifying the respective printers; for example, network addresses or IP addresses.

In a concrete procedure, the print load distribution apparatus 80 reads a printer ID assigned to a printer of interest, which is the object to be monitored, from the group information storage unit 113, sends a requirement signal to the printer of interest with the printer ID to require transmission of monitor information, and receives the monitor information transmitted from the job status monitor unit 104 and the printer status monitor unit 105 in the printer of interest, which has received the requirement signal.

In the print load distribution apparatus 80, a job transfer decision unit 114 specifies a source printer that requires job transfer (that is, the printer that requires transfer of a print job stored in the buffer 55 to another printer) and a destination printer that receives the transferred print job, based on the monitoring results transmitted from the job status monitor unit 111 and the printer status monitor unit 112 [6] and [7]. The processing selects any printer having a long queue of the print jobs based on the monitoring results of the job status monitor unit 111 and any printer with its printing mechanism 51 in an error status (for example, failure, paper jam, or out of paper) based on the monitoring results of the printer status monitor unit 112. The processing specifies the selected printer as the source printer of the job transfer. The processing then selects one of the printers having sufficiently short queues of the print jobs among the printers 50, 60, and 70 with the printer IDs stored in the group information storage unit 113, and specifies the selected printer as the destination printer. The printer having a long queue of the print jobs represents a printer where the rate of the summed storage capacities of the print jobs to the total capacity of the buffer 55 is not less than a preset level C1. The printer having a short queue of the print jobs represents a printer where the rate of the summed storage capacities of the print jobs to the total capacity of the buffer 55 is not greater than another preset level C2. The preset level C1 is greater than the preset level C2, although an identical value may be set to both the preset levels C1 and C2.

In the print load distribution apparatus 80, a job transfer instruction unit 115 subsequently outputs an instruction to the source printer that requires the job transfer to transfer a print job. The instruction is sent to the job management unit 103 included in the printer control circuit 53 of the source printer that requires the job transfer (the printer 50 in the illustrated example) [8]. In the print load distribution unit 80, the job transfer instruction unit 115 informs a job transfer transmission unit 116 of the printer ID assigned to the destination printer [9].

The job management unit 103 of the printer 50 that has received the instruction of job transfer from the job transfer instruction unit 115 takes into account a priority order, which has previously been allocated to the respective print jobs, selects a print job to be transferred among the plurality of print jobs stored in the buffer 55, and sends the selected print job from the buffer 55 to a job transfer transmission unit 106 in the printer control circuit 53 [10]. The job transfer transmission unit 106 then transmits the selected print job to a job transfer receiver unit 117 of the print load distribution apparatus 80 [11].

In the print load distribution apparatus 80, the print job received by the job transfer receiver unit 117 is sent to the job transfer transmission unit 116 [12]. The job transfer transmission unit 116 is informed of the printer ID assigned to the destination printer by the job transfer instruction unit 115 as mentioned previously. The job transfer transmission unit 116 accordingly transmits the print job sent from the job transfer receiver unit 117 to the destination printer (the printer 60 in the illustrated example) [13]. A job transfer information unit 118 receives the information representing the printer ID of the destination printer from the job transfer instruction unit 115 [14], as well as the sender information included in the print job and the information representing the name of a printed matter specified by the print job from the job transfer receiver unit 117 [16]. The job transfer information unit 118 informs the client PC, which is the output source of the print job subjected to the job transfer, of the name of the printed matter and the printer ID assigned to the destination printer that will receive the transferred print job [16]. This arrangement gives information regarding the destination of transfer of the print job to the client PC, which is the output source of the print job. The operator is thus conveniently notified of the printer that will print out the job.

In the printer 60, the print job transmitted from the job transfer transmission unit 116 is received by a job transfer receiver unit 107 and subsequently stored in the buffer 55 [17]. This process causes one print job to be transferred from the printer 50 having a long queue of the print jobs (or from the printer having the printing mechanism 51 in the error status) to the printer 60 having a shorter queue of the print jobs and thus to quickly undergo a printing operation in the printer 60.

In the print load distribution apparatus 80, the job transfer information unit 118 informs the client PC, which is the output source of a print job, of the destination of job transfer. In a modified configuration that omits the job transfer information unit 118, the job transfer instruction unit 115 may transmit the destination as well as the instruction of job transfer to the printer with a print job stored therein (the source printer) and subsequently send information on the destination of transfer of the print job from the source printer to the client PC, which is the output source of the print job.

The respective units 103 to 107 included in each printer control circuit 53 shown in FIG. 3 are actualized by the computer programs stored in advance in the ROM 53b, which is constructed in the hardware configuration of FIG. 2, and by a diversity of processing executed by the CPU 53a according to the computer programs. The buffers in the job status monitor unit 111 and the printer status monitor unit 112 and the group information storage unit 113 included in the print load distribution apparatus 80 shown in FIG. 3 are actualized by the RAM 80c, which is constructed in the hardware configuration of FIG. 2. The respective units 111 and 114 to 118 included in the print load distribution apparatus 80 shown in FIG. 3 are actualized by the computer programs stored in advance in the ROM 80b, which is constructed in the hardware configuration of FIG. 2, and by a diversity of processing executed by the CPU 80a according to the computer programs.

The computer programs executed by the printer control circuit 53 and the print load distribution apparatus 80 have been stored in advance in the ROMs 53b and 80b, respectively. In a modified arrangement, the computer programs stored in external computer readable recording media may be downloaded from the recording media via the input-output interfaces 53d and 80d and transferred to the RAMs 53c and 80c. Typical examples of the available recording media include floppy disks, hard disks, CD-ROMs, magneto-optic discs, and IC cards. In another modified arrangement, these computer programs may be downloaded from a specific server connected to the computer network 90 and be transferred to the RAMs 53c and 80c.

The following describes a variety of processing routines described in such computer programs. The CPU 53a in each printer control circuit 53 executes a spool printing process routine to implement spool printing and a job transmission process routine to transmit print jobs to and from the print load distribution apparatus 80. The CPU 80a in the print load distribution apparatus 80 executes a print load distribution process routine to distribute the print load.

Figure 4:
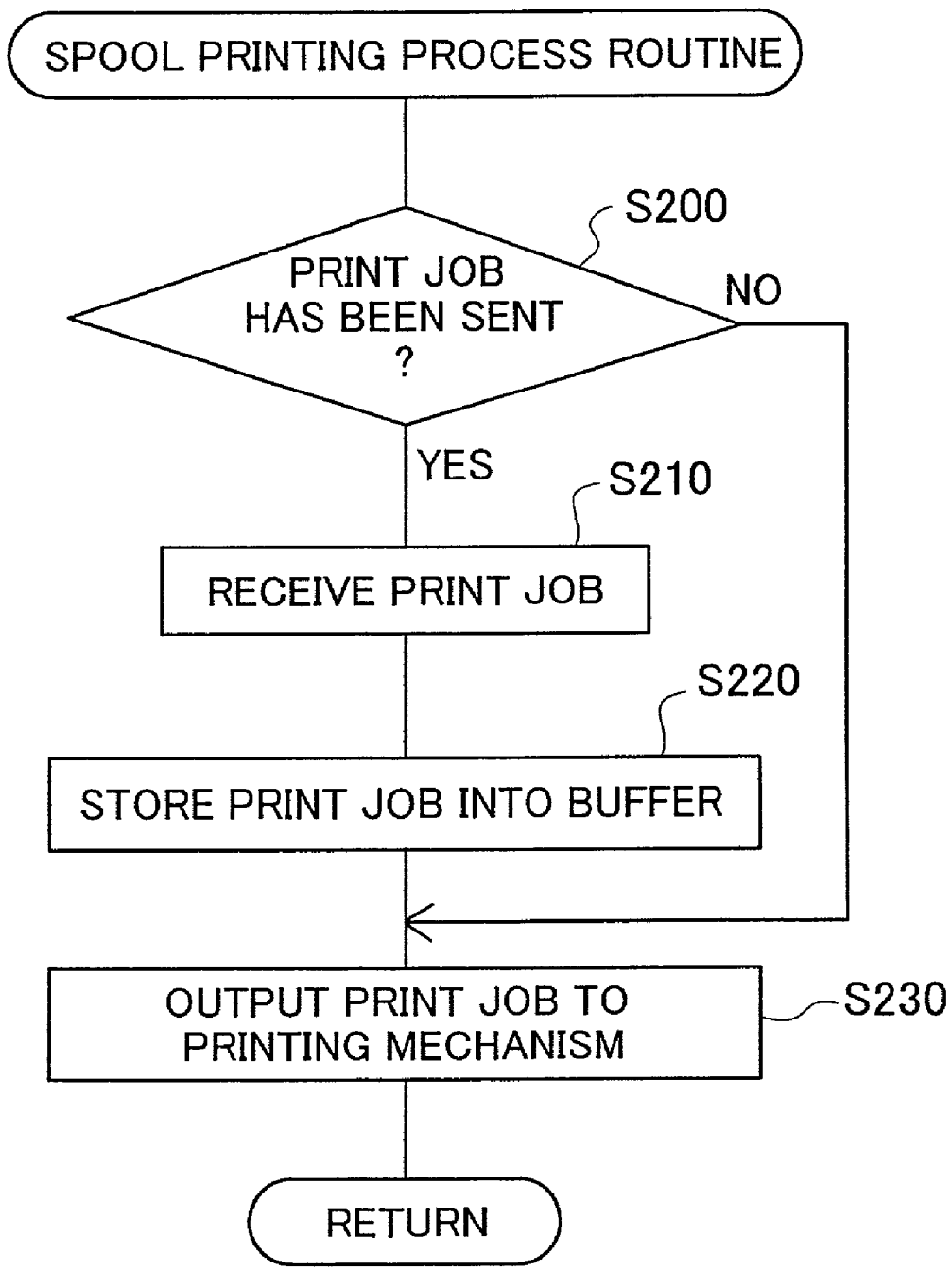
FIG. 4 is a flowchart showing a spool printing process routine executed by a CPU 53a in the printer control circuit 53.
Figure 5:
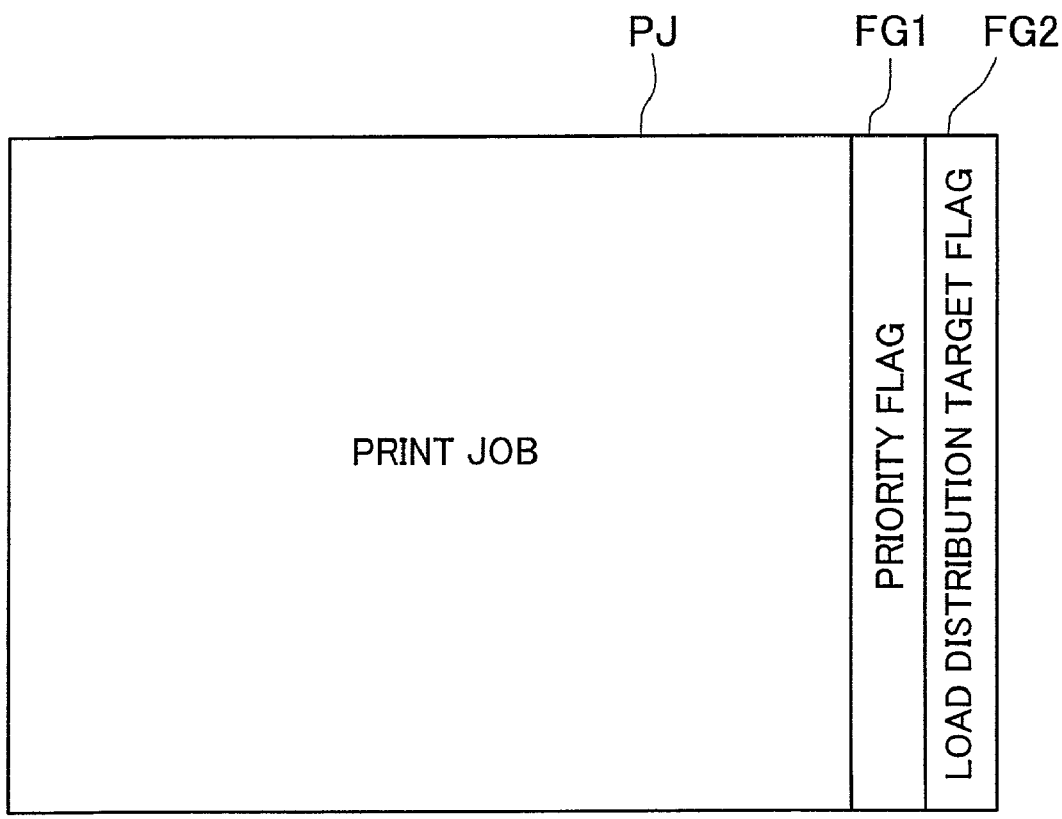
FIG. 5 shows a print job PJ and flags FG1 and FG2 attached thereto.

FIG. 4 is a flowchart showing the spool printing process routine executed by the CPU 53a in the printer control circuit 53. This process routine is iteratively carried out at preset time intervals. When the program enters the process routine, the CPU 53a in the printer control circuit 53 first determines whether or not a print job has been sent from any of the client PCs 20, 30, and 40 connected to the computer network 90 (step S200). As shown in FIG. 5, each print job PJ sent from any of the client PCs 20, 30, and 40 has priority identification data FG1 and a load distribution target flag FG2 attached thereto. The priority identification data FG1 represents the priority of printing. For example, one letter selected among 'A', 'B', and 'C' may be set to the flag FG1, where 'A' represents the highest priority, 'B' represents the higher priority, and 'C' represents the standard priority. The load distribution target flag FG2 shows whether or not the print job is subjected to the job transfer for the purpose of distributing the print load. Either of numerical values '1' and '0' is set to the flag FG2.

When it is determined at step S200 that the print job with these flags FG1 and FG2 attached thereto has been sent, the CPU 53a receives the print job (step S210) (in the description hereof, each print job has the flags FG1 and FG2 attached thereto, although the fact may not be mentioned specifically), and stores the received print job in the spool buffer 55 provided in the RAM 53c (step S220). The CPU 53a subsequently extracts one print job having the earliest ordinal number of storage among the print jobs stored in the buffer 55 and outputs the extracted print job to the printing mechanism 51 (step S230). The printing mechanism 51 then prints the print jobs stored in the buffer 55 in the order of storage.

The processing of step S230 is executed when any print job is present in the buffer 55, and is not executed in the absence of any print job in the buffer 55. The processing of step S220 and the processing of step S230 are shown in this sequence for convenience of illustration of the flowchart. These steps are, however, actually executed in parallel to attain the spool function. After such processing, the program goes to RETURN and exits from this process routine. In the case of a negative answer at step S200, the program skips the processing of steps S210 and S220 and directly goes to step S230 to print an existing print job.

Figure 6:
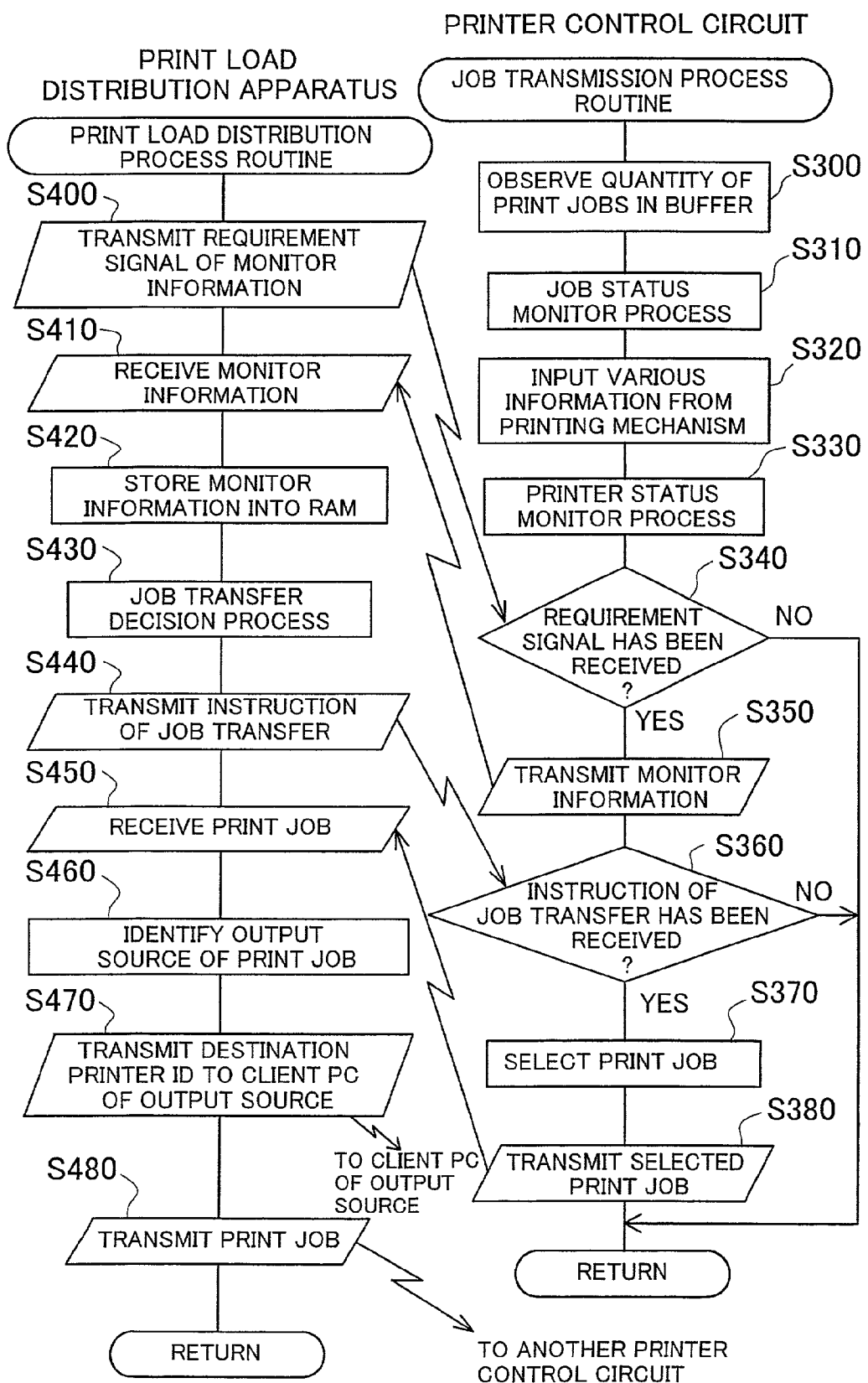
FIG. 6 is a flowchart showing a job transmission process routine executed by the CPU 53a in the printer control circuit 53 and a print load distribution process routine executed by a CPU 80a in the print load distribution apparatus 80.

FIG. 6 is a flowchart showing the job transmission process routine executed by the CPU 53a in the printer control circuit 53 and the print load distribution process routine executed by the CPU 80a in the print load distribution apparatus 80. Both the process routines are iteratively carried out at preset intervals. When the program enters the job transmission process routine, the CPU 53a in the printer control circuit 53 first observes the quantity of print jobs stored in the spool buffer 55 provided in the RAM 53c (step S300), and carries out a job status monitor process, based on the observation result, to determine the congestion status of the print jobs stored in the buffer 55 (step S310). Observation of the quantity of print jobs at step S300, for example, measures the total number of unprocessed print jobs that are present in the buffer 55. A possible modification may additionally take into account the number of pages included in each printed matter defined by each print job. One available procedure may divide the quantity of print jobs observed at step S300 by a mean output capacity of the printer. This calculates the load currently applied to the printer relative to the output capacity of the printer. The procedure may determine the congestion status of the print jobs according to the calculated load.

The CPU 53a inputs from the printing mechanism 51 various pieces of information representing the working status of the printing mechanism 51 (step S320). The CPU 53a then carries out a printer status monitor process, based on the input various pieces of information, to specify the current working status of the printing mechanism 51; that is, either in the normal working status or in an error status, for example, due to failure, paper jam, or out of paper (step S330).

After execution of step S330, the CPU 53a determines whether or not a requirement signal to require the monitor information has been received from the print load distribution apparatus 80 (step S340). The requirement signal is transmitted at first step S400 in the print load distribution process routine executed by the CPU 80a in the print load distribution apparatus 80. The destination of transmission of the requirement signal is specified by the printer ID assigned to the printer of interest, which is the object to be monitored and has been stored in advance in a predetermined area in the RAM 80c (corresponding to the group information storage unit 113 discussed previously).

When it is determined at step S340 that no requirement signal has been received, the program goes to RETURN and exits from this process routine. When it is determined at step S340 that the requirement signal has been received, on the other hand, the results of the job status monitor process at step S310 (hereinafter referred to as the job status monitor information) and the results of the printer status monitor process at step S330 (hereinafter referred to as the printer status monitor information) are transmitted to the print load distribution apparatus 80 via the network control circuit 53e (step S350).

In the print load distribution process routine, after transmitting the requirement signal to require the monitor information at step S400, the CPU 80a in the print load distribution apparatus 80 receives the job status monitor information and the printer status monitor information transmitted from any of the printers 50, 60, and 70 that has received the requirement signal (step S410). The CPU 80a successively stores the received pieces of information with regard to any of the printers into the RAM 80c (step S420).

The CPU 80a subsequently carries out a job transfer decision process to specify a source printer that requires the job transfer and a destination printer that receives the transferred print job, based on the job status monitor information and the printer status monitor information stored in the RAM 80c (step S430). The job transfer decision process selects a printer having a long queue of print jobs based on the job status monitor information and a printer with its printing mechanism 51 in an error status based on the printer status monitor information. These printers (that is, the printer having a long queue of print jobs and the printer in the error status) are specified as the source printer that requires the job transfer for entrusting at least one print job to another printer. One of the printers having sufficiently short queues of print jobs is specified as the destination printer, based on the job status monitor information.

The CPU 80a subsequently sends an instruction to transfer a print job to the source printer that requires the job transfer (step S440).

In the job transmission process routine, after execution of the processing of step S350, the CPU 53a in the printer control circuit 53 determines whether or not the instruction of job transfer sent from the print load distribution apparatus 80 at step S440 has been received (step S360). When it is determined at step S360 that no instruction of job transfer has been received, the program goes to RETURN and exits from this process routine. When it is determined at step S340 that no requirement signal has been received, the program also goes to RETURN and exits from this process routine, as mentioned previously.

When it is determined at step S360 that the instruction of job transfer has been received, on the other hand, the CPU 53a selects a print job that is subjected to the job transfer, among the plurality of print jobs stored in the spool buffer 55 (step S370). A concrete procedure of the selection successively reads all the print jobs that are present in the buffer 55, and determines whether or not each print job can be subjected to the job transfer for the purpose of distributing the print load, based on the determination of whether or not the load distribution target flag FG2 attached to each print job is equal to the value '1', The procedure checks the print jobs, which are determined to be potential objects of the job transfer, for the priority order defined by the priority identification data FG1, and selects a print job having the highest priority among all the print jobs that can be subjected to the job transfer. In the case where a plurality of print jobs having the highest priority are selected, a print job having the latest ordinal number of storage in the buffer 55 is specified as the object of the job transfer. All the plurality of selected print jobs may alternatively be specified as the object of the job transfer, when the total data capacity of the print jobs is acceptable.

The CPU 53a subsequently transmits the selected print job as the object of job transfer to the print load distribution apparatus 80 (step S380). In the print load distribution process routine, after transmitting the instruction of job transfer at step S440, the CPU 80a in the print load distribution apparatus 80 receives the print job transmitted at step S380 from the source printer that has received the instruction (step S450). The CPU 80a then identifies the client PC, which is the output source of the print job, based on the sender information included in the received print job (step S460). The CPU 80a subsequently transmits the name of the printed matter defined by the print job received at step S450 and the printer ID for identifying the destination printer specified at step S430 to the client PC identified at step S460 as the output source of the print job (step S470). The CPU 80a then transmits the print job received at step S450 to the destination printer specified at step S430 (step S480).

The destination printer receives the print job transmitted from the print load distribution apparatus 80 (step S210) and stores the received print job into the buffer 55 (step S220) according to the spool printing process routine discussed previously. The destination printer then outputs the print job to its printing mechanism to print out (step S230).

In the job transmission process routine, after the execution of the processing at step S380, the CPU 53a in the printer control circuit 53 goes to RETURN and exits from this process routine. In the print load distribution process routine, after the execution of the processing at step S480, the CPU 80a in the print load distribution apparatus 80 goes to RETURN and exits from this process routine.

According to the procedure of this embodiment, in the case where a large number of print jobs are concentrated on one printer (for example, the printer 50) of the three preset printers 50, 60, and 70 among the plurality of printers connected to the computer network 90, at least one print job stored in the spool buffer 55 of the printer (50) is transferred to another printer (60 or 70) of the three preset printers 50, 60, and 70. When a number of print jobs are concentrated on one printer, another printer having a spare capacity is entrusted with the transferred print job. This arrangement advantageously ensures quick completion of the printing operations.

In the event that a print job is sent to the printing apparatus that is in the error status, another printing apparatus is entrusted with the print job. This arrangement thus ensures quick completion of printing operations.

In the procedure of this embodiment, the priority identification data FG1 and the load distribution target flag FG2 attached to each print job are used to determine whether transfer of the print job for the purpose of distribution of the print load is allowed or prohibited and also specify the priority order of the job transfer. In the case where the operator desires printout of a certain print job from a specific printing apparatus, this arrangement effectively prevents the certain print job from being transferred to another printing apparatus. The print jobs having the highest priority of printing are preferentially transferred to another printing apparatus.

In the procedure of the above embodiment, the printer having a long queue of print jobs in the buffer and the printer in the error status, for example, due to failure, paper jam, or out of paper are specified as the source printer that requires the job transfer for entrusting at least one print job stored in the buffer to another printer. Either one of such printers may alternatively be specified as the source printer. In accordance with another application that sets a planned time of completion of printing in a certain printer, when the planned time of completion of printing is not expected to be fulfilled according to the progress of print jobs in the buffer, the certain printer may be specified as the source printer that requires the job transfer to another printer.

In the above embodiment, the printer having a sufficiently short queue of print jobs in the buffer is specified as the destination printer. Another application may specify a printer that has a short queue of print jobs and is not in the error status, for example, due to failure, paper jam, or out of paper, as the destination printer. Still another application may specify a printer that is not in the error status, as the destination printer.

Figure 7:
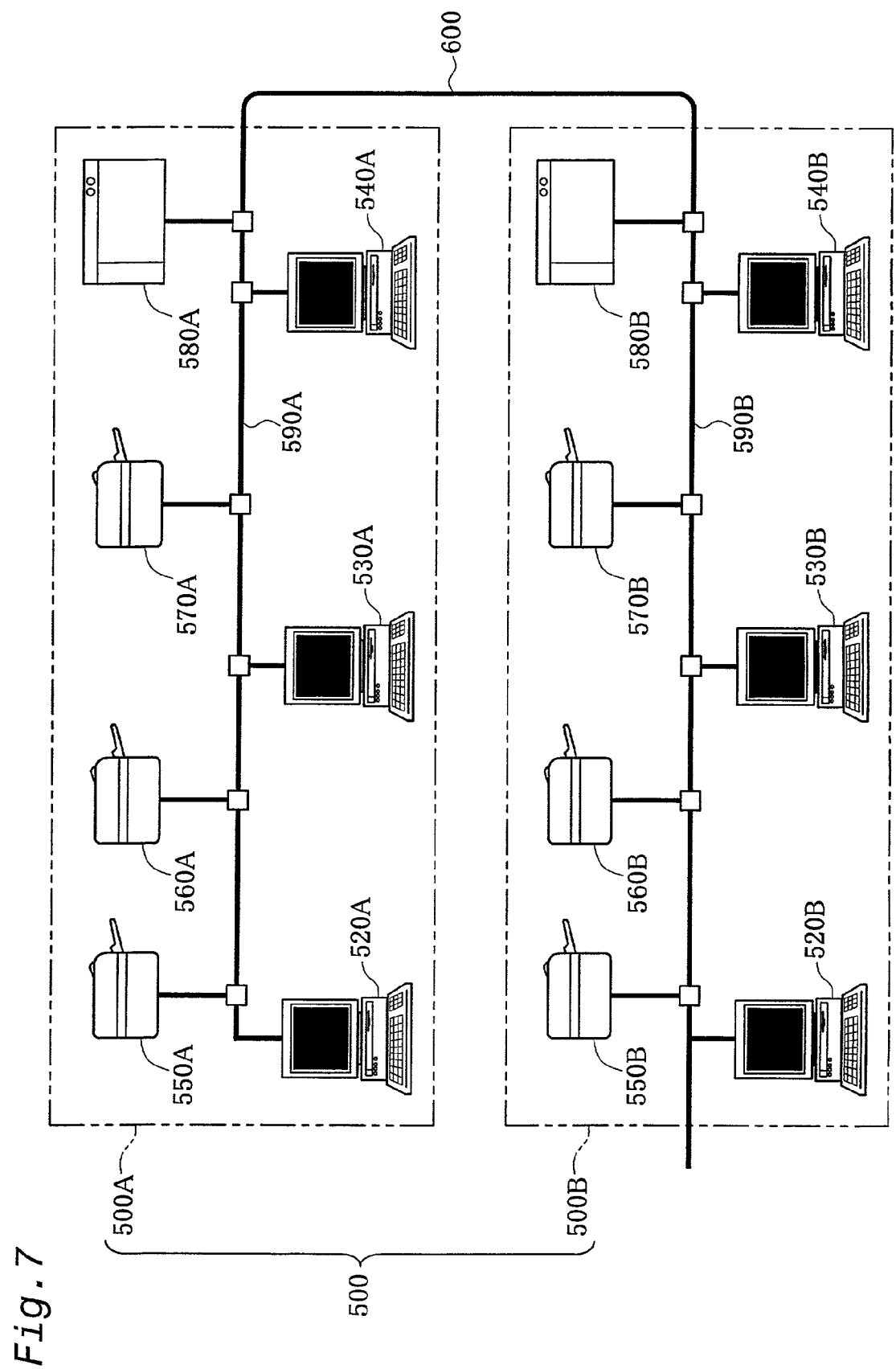
FIG. 7 schematically illustrates the configuration of another computer system in a second embodiment of the present invention.

The following discussion regards a second embodiment of the present invention. FIG. 7 schematically illustrates the configuration of a computer system in the second embodiment of the present invention. A computer system 500 of this embodiment includes a first computer system 500A, a second computer system 500B, and a computer network 600 that mutually connects the two computer systems 500A and 500B with each other.

The first computer system 500A has a similar configuration to that of the computer system 10 of the first embodiment. The computer system 500A includes a plurality of (three in the illustration of FIG. 7) client PCs 520A, 530A, and 540A that respectively output print jobs, a plurality of (three in the illustration of FIG. 7) printers 550A, 560A, and 570A that carry out printing operations in response to the print jobs, and a print load distribution apparatus 580A that distribute the print load of the printers 550A to 570A, which are mutually connected via a computer network 590A. The second computer system 500B also has a similar configuration to that of the computer system 10 of the first embodiment. The computer system 500B includes client PCs 520B, 530B, and 540B, printers 550B, 560B, and 570B, and a print load distribution apparatus 580B, which are mutually connected via a computer network 590B.

The computer network 600 is constructed as a LAN. The computer network 600 may, however, be any of diverse networks, for example, the Internet, an Intranet, or a Wide Area Network (WAN), in place of the LAN. In general, the first computer system 500A and the second computer system 500B are significantly distant from each other; for example, on different floors like first and second floors or in different buildings like a head quarter and a branch. The two computer systems 500A and 500B are, however, not restricted to the significantly distant layout, but may be close to each other as long as the individual ranges of the network are distinct.

In the computer system 500 of the above configuration, a series of processing discussed below is carried out. In the first computer system 500A, print jobs are sent from any of the client PCs 520A, 530A, and 540A to any of the printers 550A, 560A, and 570A via the computer network 590A. In the case where the printer has a long queue of print jobs or is in the error status, the print load distribution apparatus 580A specifies printers having spare capacities among the printers 550A, 560A, and 570A in the own system 500A as well as the printers 550B, 560B, and 570B included in the second computer system 500B, selects one of the printers having spare capacities, and transfers at least one print job to the selected printer.

In a similar manner, in the second computer system 500B, print jobs are sent from any of the client PCs 520B, 530B, and 540B to any of the printers 550B, 560B, and 570B. In the case where the printer has a long queue of print jobs or is in the error status, the print load distribution apparatus 580B specifies printers having spare capacities among all the printers 550B to 570B and 560B to 570B in the first and second computer systems 500B and 500A, selects one of the printers having spare capacities, and transfers at least one print job to the selected printer.

Figure 8:
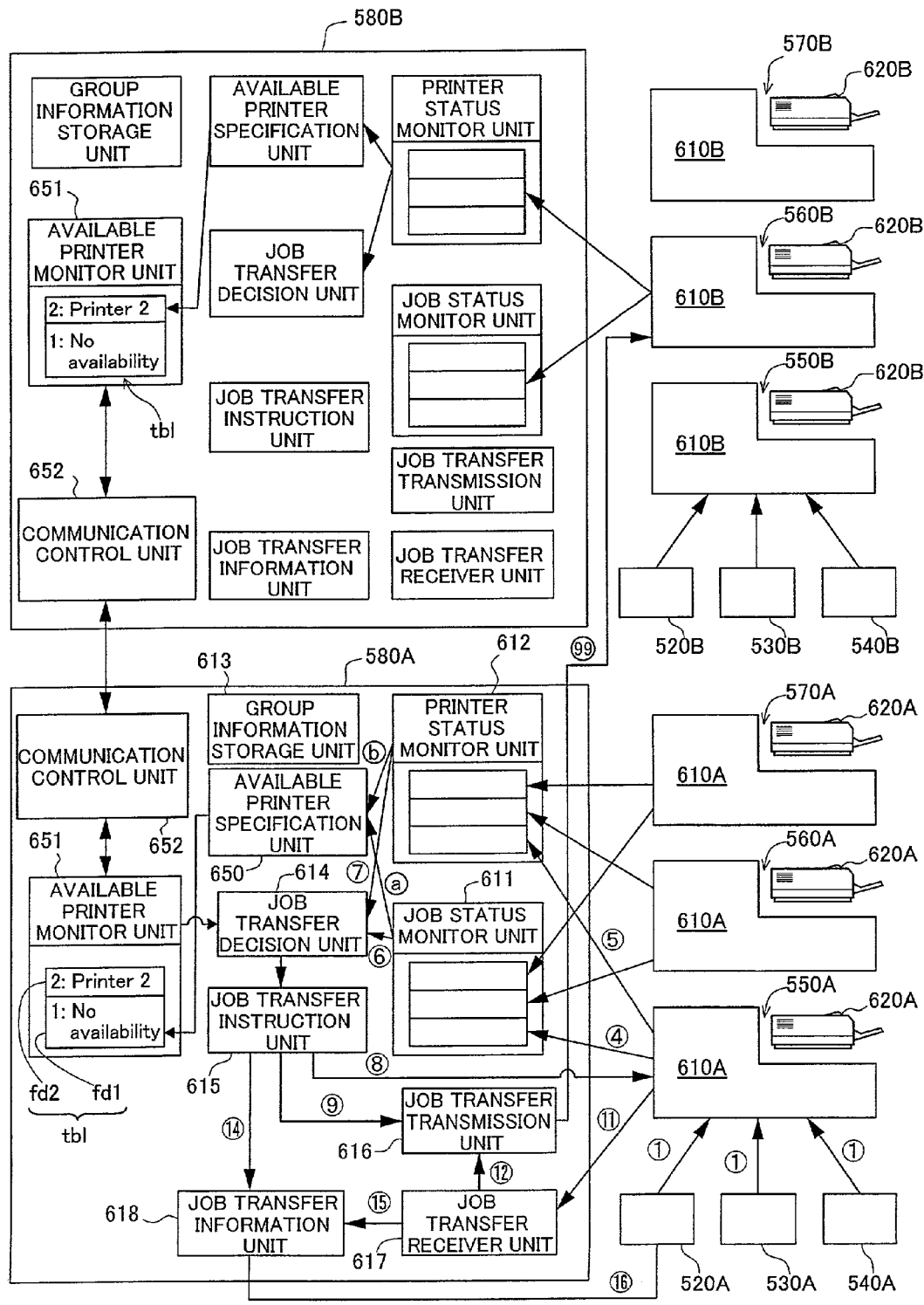
FIG. 8 is a block diagram showing details of the processing executed by print load distribution apparatuses 580A and 580B included in computer systems 500A and 500B, in relation to printer control circuits 610A and 610B of respective printers.

The following describes the details of this processing. FIG. 8 is a block diagram showing details of the processing executed by the print load distribution apparatuses 580A and 580B included in the respective computer systems 500A and 500B, in relation to printer control circuits 610A and 610B of the respective printers 550A to 570A and 550B to 570B. The printer control circuits 610A and 610B carry out the identical series of processing with that executed by the printer control circuit 53 of the first embodiment. Like the print load distribution apparatus 80 of the first embodiment, each of the print load distribution apparatuses 580A and 580B has a job status monitor unit 611, a printer status monitor unit 612, a group information storage unit 613, a job transfer decision unit 614, a job transfer instruction unit 615, a job transfer transmission unit 616, a job transfer receiver unit 617, and a job transfer information unit 618. The primary difference from the first embodiment is that each of the print load distribution apparatuses 580A and 580B further includes an available printer specification unit 650, an available printer monitor unit 651, and a communication control unit 652.

In the print load distribution apparatus 580A, a series of signal-based processing defined by [1], [4] to [9], [11], [12], and [14] to [16] is executed by the same constituents as those of the first embodiment. These signal-based processes are identical with those discussed in the first embodiment and are expressed by the same numerals as those of the first embodiment.

In the print load distribution apparatus 580A, another series of processing, which is not performed in the print load distribution apparatus 80 of the first embodiment, is executed by the constituents that are not included in the first embodiment as discussed below.

In the print load distribution apparatus 580A, the available printer specification unit 650 receives the monitoring results from both the job status monitor unit 611 and the printer status monitor unit 612 [a] and [b]. The available printer specification unit 650 then specifies printers having sufficiently short queues of print jobs and printing mechanisms 620A in the normal working status (Hereinafter such printers are referred to as available printers. Although the available printer is typically required to satisfy only the condition of having a sufficiently short queue of print jobs, the available printer here has a short queue of print jobs and is not in the error status), among the printers 550A, 560A, and 570A included in its own computer system 500A, and selects one out of the available printers. The selection may be any available printer or an available printer satisfying a predetermined condition, for example, a printer specified first. The available printer specification unit 650 then informs the available printer monitor unit 651 of a printer ID assigned to the selected available printer [c]. When there is no available printer, information representing the fact (for example, 'no availability') is notified.

The available printer monitor unit 651 is provided with a table tb1 having a plurality of fields fd1 and fd2 corresponding to the number of computer systems included in the computer system 500 (in this embodiment, two computer systems, that is, the first computer system 500A and the second computer system 500B). The first field fd1 and the second field fd2 respectively correspond to the first computer system 500A and the second computer system 500B. The available printer monitor unit 651 stores the printer ID transmitted from the available printer specification unit 650 in the field fd1 corresponding to its own computer system 500A.

The available printer monitor unit 651 then sends the printer ID transmitted from the available printer specification unit 650 and a computer system ID used for identifying its own computer system 500A to the communication control unit 652 [d]. The communication control unit 652 transmits available printer information including the printer ID and the computer system ID to and from the other communication control unit 652 provided in the print load distribution unit 580B of the second computer system 500B [e]. The available printer monitor unit 651 included in the print load distribution apparatus 580B of the second computer system 500B receives the available printer information transmitted from the communication control unit 652 and writes the printer ID in the field fd1 corresponding to the computer system 500A defined by the computer system ID. In a similar manner, the available printer monitor unit 651 in the second computer system 500B sends available printer information, which includes a printer ID transmitted from the available printer specification unit 650 of its own computer system 500B and a computer system ID for identifying the computer system 500B, to the first computer system 500A via the communication control unit 652 [e]. The available printer monitor unit 651 provided in the first computer system 500A receives the available printer information via the communication control unit 652 and writes the printer ID in the field fd2 corresponding to the computer system 500B defined by the computer system ID.

The available printer information regarding the printers managed by the respective computer systems 500A and 500B is transmitted between the computer systems 500A and 500B defined by the table tb1. This arrangement causes the contents of the tables tb1 stored in the respective available printer monitor units 651 of the print load distribution apparatuses 580A and 580B of the respective computer systems 500A and 500B to be common to the computer systems 500A and 500B and always represent the latest available printer information written in the respective computer systems 500A and 500B.

The available printer monitor unit 651 informs the job transfer decision unit 614 of the contents of the table tb1. The job transfer decision unit 614 adopts the same technique to specify the source printer requiring the job transfer as that of the job transfer decision unit 114 discussed in the first embodiment. But the job transfer decision unit 614 adopts a different technique to specify the destination printer. The procedure of the first embodiment specifies the destination printer in the range of one computer system 10. The procedure of the second embodiment, on the other hand, specifies the destination printer in the range of the two computer systems 500A and 500B (that is, in the range of the computer systems defined as the fields by the available printer monitor units 651), based on the contents of the table tb1 notified by the available printer monitor units 651. The procedure searches for any available printers that have sufficiently short queues of print jobs and are not in the error status in the range of the two computer systems 500A and 500B, based on the contents of the table tb1. If there is any available printer, the available printer is specified as the destination printer. In the case where available printers are found in both the computer systems 500A and 500B, the available printer included in its own computer system 500A is preferentially specified as the destination printer. The printer in the own computer system 500A is generally close in distance to the client PC 520A, which is the output source of the print job. Such preference ensures easier pickup of a resulting printed matter.

The print load distribution apparatus 580A then informs the job transfer instruction unit 615 of both a printer ID assigned to the source printer requiring the job transfer and a printer ID assigned to the destination printer, which have been specified by the job transfer decision unit 614. The job transfer instruction unit 615 executes the same series of processing as that discussed in the first embodiment. The job transfer transmission unit 616 accordingly transmits a print job sent from the job transfer receiver unit 617 to the selected available printer, which is specified as the destination printer (in the case of the contents of the table tb1 illustrated in FIG. 8, to the second printer 560B included in the second computer system 580B) [99]. This series of processing causes one print job to be transferred from the printer 550A having the long queue of print jobs (or the printer 550A having the printing mechanism 620A in the error status) to the available destination printer 560B, which has been selected in the range including both its own computer system 500A and the other computer system 500B. The destination printer 560B carries out printing operations in response to the print job without delay.

The characteristic units in each of the print load distribution apparatuses 580A and 580B shown in FIG. 8, which are different from the first embodiment, that is, the available printer specification unit 650, the available printer monitor unit 651, and the communication control unit 652, are actualized by computer programs stored in advance in a ROM, which is constructed in the hardware configuration of the print load distribution apparatus 580A or 580B, and a variety of processing executed by a CPU according to the computer programs. The respective units 611 to 618 in each of the print load distribution apparatuses 580A and 580B shown in FIG. 8, which are identical with the equivalents of the first embodiment, are also actualized by computer programs stored in advance in the ROM and a diversity of processing executed by the CPU according to the computer programs.

The computer programs executed by the print load distribution apparatus 580A or 580B have been stored in advance in its ROM. Like the first embodiment, however, the computer programs may be downloaded from external computer readable recording media via input-output interfaces and transferred to the RAM. In another application, the computer programs may be downloaded from a specific server connected to the computer networks 590A and 590B and be transferred to the RAM.

Figure 9:
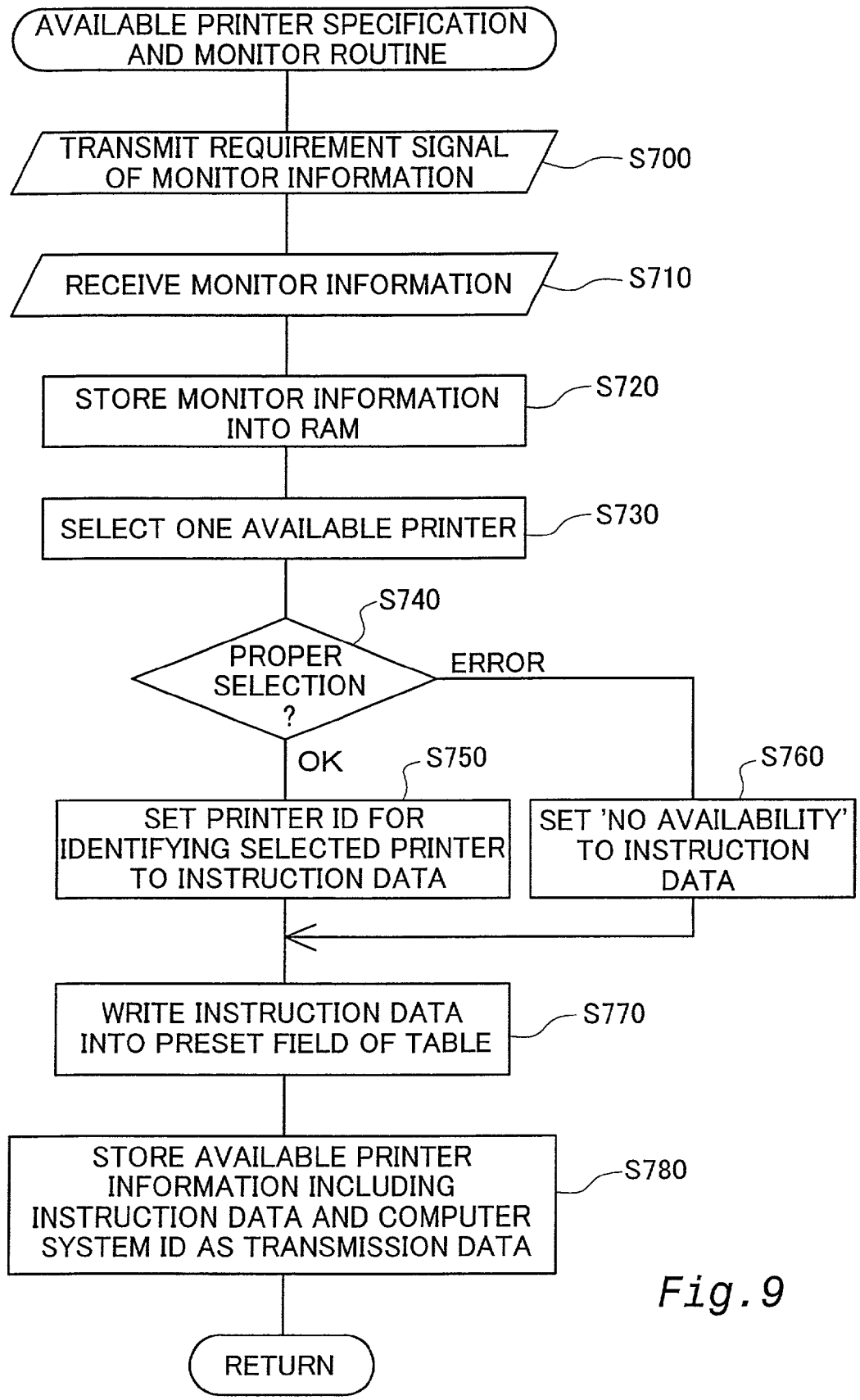
FIG. 9 is a flowchart showing an available printer specification and monitor routine executed by a CPU in the print load distribution apparatus 580A or 580B.

Among a diversity of processing routines described in such computer programs, processing routines characteristic of the second embodiment are discussed below. The CPU in the print load distribution apparatus 580A (580B) executes an available printer specification and monitor routine to actualize the available printer specification unit 650 and the available printer monitor unit 651, while executing a communication control routine to actualize the communication control unit 652. FIG. 9 is a flowchart showing the available printer specification and monitor routine. This routine is iteratively carried out at preset time intervals.

When the program enters the routine, the CPU in the print load distribution apparatus 580A (580B) carries out the series of processing at steps S700, S710, and S720, which is identical with the processing of steps S400, S410, and S420 of the first embodiment. The CPU subsequently specifies available printers having sufficiently short queues of print jobs and their printing mechanisms 620A not in the error status, among the printers 550A, 560A, and 570A (550B, 560B, and 570B) included in its own computer system 500A (500B), based on the job status monitor information and the printer status monitor information, which have been stored in the RAM of the print load distribution apparatus 580A at step S720, and selects one out of the available printers (step S730). The selection may be any available printer or an available printer satisfying a predetermined condition as described previously.

The CPU then determines whether one available printer has been selected in a proper manner at step S730 or no available printer has been selected (step S740). In the case of the proper selection, the printer ID for identifying the selected available printer is stored as instruction data (step S750). In the case of no selection of any available printer at step S730, on the contrary, the fact 'no availability' is stored as the instruction data (step S760). The instruction data obtained at either step S750 or S760 is written into the field fd1 (fd2) corresponding to the own computer system 500A (500B) (step S770). The field fd1 (fd2) is included in the table tb1 provided in the RAM as mentioned previously. The CPU subsequently stores the available printer information into the RAM as transmission data, which is to be transmitted (step S780). The available printer information includes the instruction data and a computer system ID for identifying the own computer system 500A (500B) (For example, the ID is set equal to '1' in the case of the first computer system 500A and is set equal to '2' in the case of the second computer system 500B). After execution of the processing at step S780, the program exits from this routine.

Figure 10:
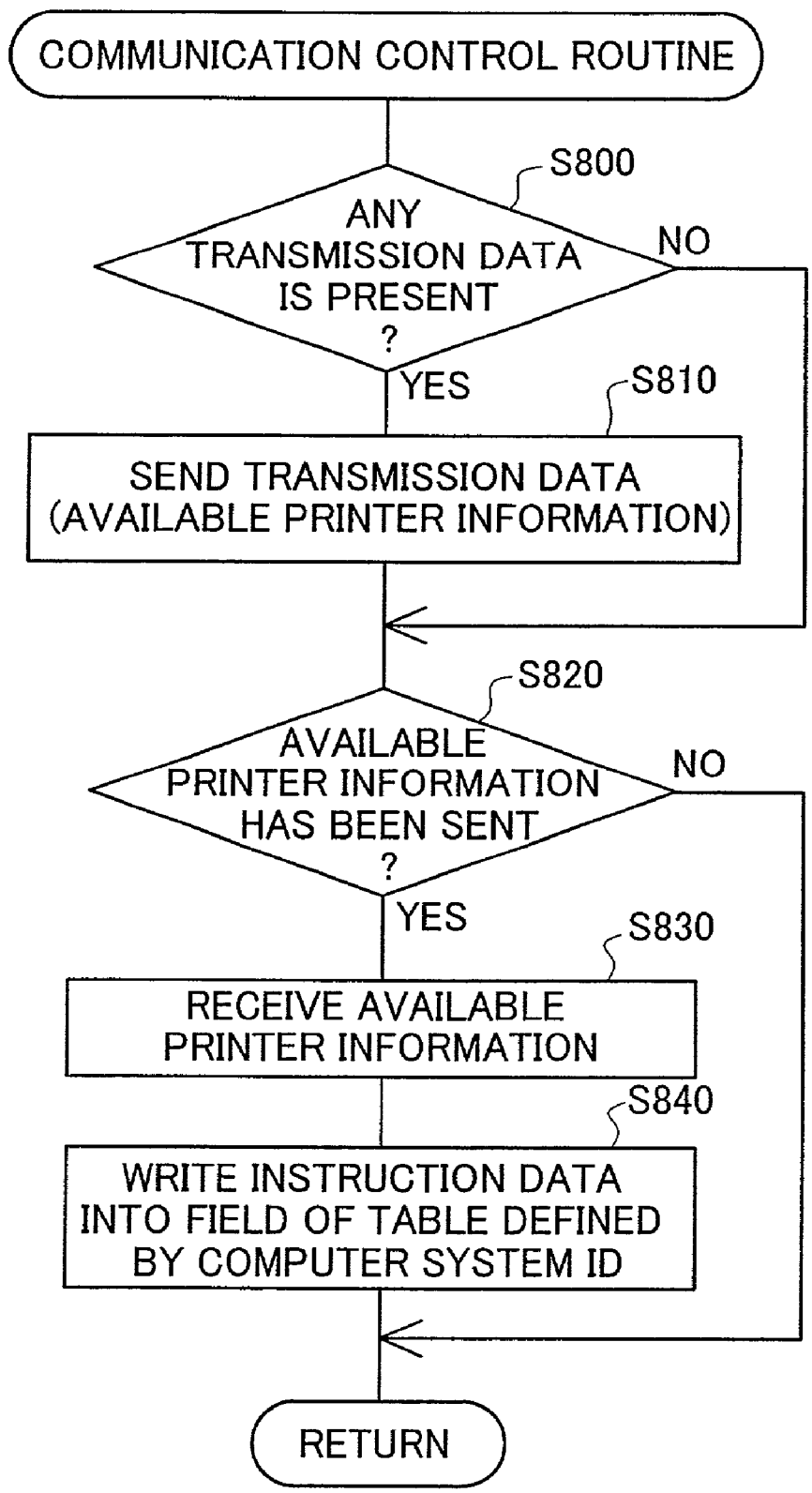
FIG. 10 is a flowchart showing a communication control routine executed by the CPU in the print load distribution apparatus 580A (580B)

FIG. 10 is a flowchart showing the communication control routine executed by the CPU in the print load distribution apparatus 580A (580B). This routine is iteratively carried out at preset time intervals.

When the program enters the routine, the CPU in the print load distribution apparatus 580A (580B) first determines whether or not there is any transmission data stored at step S780 in the available printer specification and monitor routine (step S800). When it is determined that there is any transmission data, the CPU reads the transmission data (available printer information) from the RAM and sends the transmission data to the other computer system 580B (580A) (step S810). When it is determined at step S800 that there is no transmission data, on the other hand, the processing of step S810 is skipped.

The CPU subsequently determines whether or not the available printer information has been sent from the other computer system 580B (580A) (step S820). In the case of an affirmative answer, the CPU receives the available printer information (step S830), and writes the instruction data included in the available printer information into the field fd2 (fd1) defined by the computer system ID of the available printer information (step S830). The field fd2 (fd1) is included in the table tb1, which is provided in the RAM of the own print load distribution apparatus 580A (580B). After execution of the processing at step S830, the program goes to RETURN and exits from this routine.

In addition to the processing routines discussed above, the procedure of the second embodiment carries out processing routines similar to the print load distribution process routine and the job transmission process routine of the first embodiment shown in FIG. 6. In the print load distribution process routine of the second embodiment, the only difference from the first embodiment is a job transfer decision process at step S430. The other steps in the print load distribution process routine and all the steps in the job transmission process routine of the second embodiment are identical with those of the first embodiment.

Figure 11:
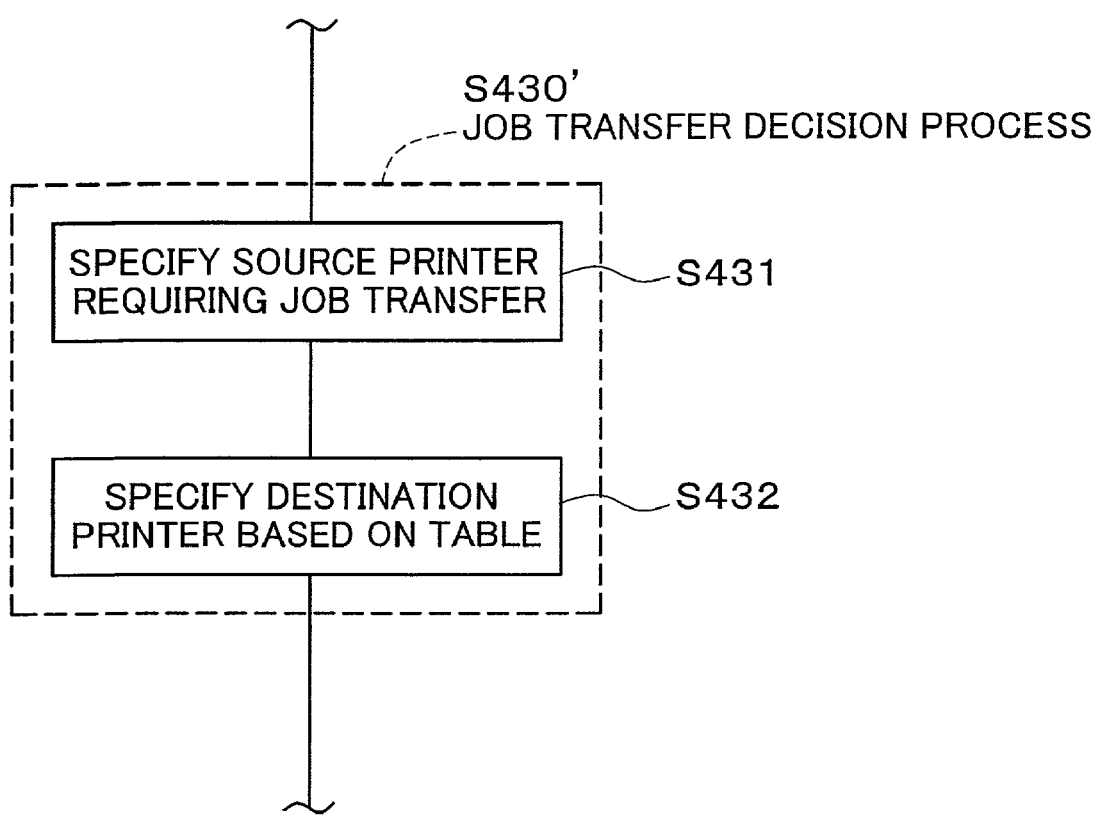
FIG. 11 is a flowchart showing details of the job transfer decision process different from the first embodiment.

FIG. 11 is a flowchart showing details of the job transfer decision process different from the first embodiment. When the processing proceeds to step S430', the CPU specifies the source printer requiring the jot transfer according to the same technique as that of the first embodiment (step S431) and subsequently specifies the destination printer based on the contents of the table tb1 provided in the RAM (step S432). The procedure searches for any available printers that have sufficiently short queues of print jobs and are not in the error status in the range of the two computer systems 500A and 500B, based on the contents of the table tb1. If there is any available printer, the available printer is specified as the destination printer. In the case where available printers are found in both the computer systems 500A and 500B, the available printer included in its own computer system 500A is preferentially specified as the destination printer.

According to the procedure of the second embodiment, in the case where a large number of print jobs are concentrated on one printer (for example, the printer 550A) among the three printers 550A, 560A, and 570A included in the first computer system 500A, at least one print job stored in the spool buffer of the printer 550A is transferred to another printer 560B in the range of the first computer system 500A and the second computer system 500B. When a number of print jobs are concentrated on one printer, another printer having a spare capacity is found in a wider range exceeding the own computer system to be entrusted with the transferred print job. This arrangement advantageously ensures quick completion of the printing operations.

In the event that a print job is sent to the printing apparatus that is in the error status, another printing apparatus is entrusted with the print job. This arrangement thus ensures quick completion of printing operations.

There are some possible modifications of the second embodiment. In the procedure of the second embodiment, the printer having a long queue of print jobs in the buffer and the printer in the error status, for example, due to failure, paper jam, or out of paper are specified as the source printer that requires the job transfer for entrusting at least one print job stored in the buffer to another printer. Either one of such printers may alternatively be specified as the source printer. In accordance with another application that sets a planned time of completion of printing in a certain printer, when the planned time of completion of printing is not expected to be fulfilled according to the progress of print jobs in the buffer, the certain printer may be specified as the source printer that requires the job transfer to another printer.

In the second embodiment, the printer that has a sufficiently short queue of print jobs in the buffer and is not in the error status, for example, due to failure, paper jam, or out of paper is specified as the destination printer. Another application may specify either a printer having a short queue of print jobs or a printer that is not in the error status, as the destination printer.

Figure 12:
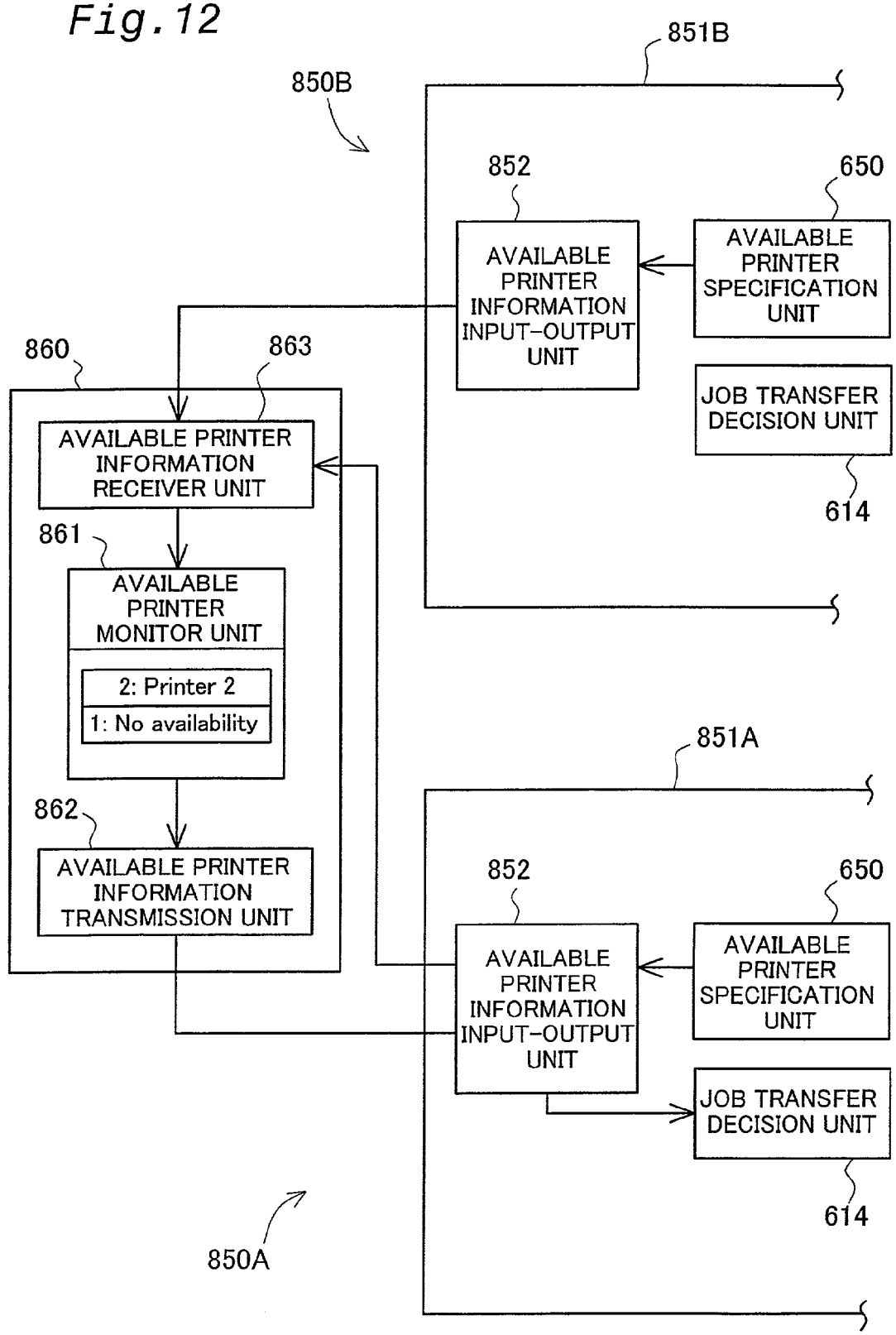
FIG. 12 is a block diagram illustrating one modified example of the second embodiment.

FIG. 12 is a block diagram illustrating one modified example. In the configuration of the second embodiment, the available printer monitor units 651 are provided individually in the print load distribution apparatuses 580A and 580B of the respective computer systems 500A and 500B. In the modified example of FIG. 12, an available printer monitor unit 861 is provided in a management computer 860, which is separate from computer systems 850A and 860B. The management computer 860 includes an available printer information transmission unit 862 and an available printer information receiver unit 863 for transmitting and receiving the available printer information, in addition to the available printer monitor unit 861.

The difference from the print load distribution apparatuses 580A and 580B of the second embodiment is that each of print load distribution apparatuses 851A and 851B included in the respective computer systems 850A and 860A of the modified example does not have the available printer monitor unit 651 or the communication control unit 652. The print load distribution apparatuses 851A and 851B have the other constituents 611 to 618 and 650, although only the job transfer decision unit 614 and the available printer specification unit 650 (expressed by the same numerals as those of the second embodiment) are included in the illustration. Each of the print load distribution apparatuses 851A and 851B further includes an available printer information input-output unit 852 for transmitting the available printer information to and from the management computer 860.

In the configuration of the modified example, the available printer information regarding the computer systems 850A and 860B obtained by the respective print load distribution apparatuses 851A and 851B is collectively managed by the management computer 860. This arrangement advantageously ensures proper specification of the destination printer for the job transfer.

The configuration of the second embodiment has two apparatus groups, that is, the first computer system 500A and the second computer system 500B. The same principle may also be adopted in a configuration having three or more apparatus groups. Such arrangement enables an available printer to be searched in a wider range and thus ensures proper specification of the destination printer for the job transfer.

In the configuration having three or more apparatus groups, the management computer may also be used to collectively manage the available printer information. One possible modification may successively expand the searching range for the available printer; for example, when no available printer is found by search of its own computer system and an adjoining second computer system, the searching range is expanded to a third computer system.

Figure 13:
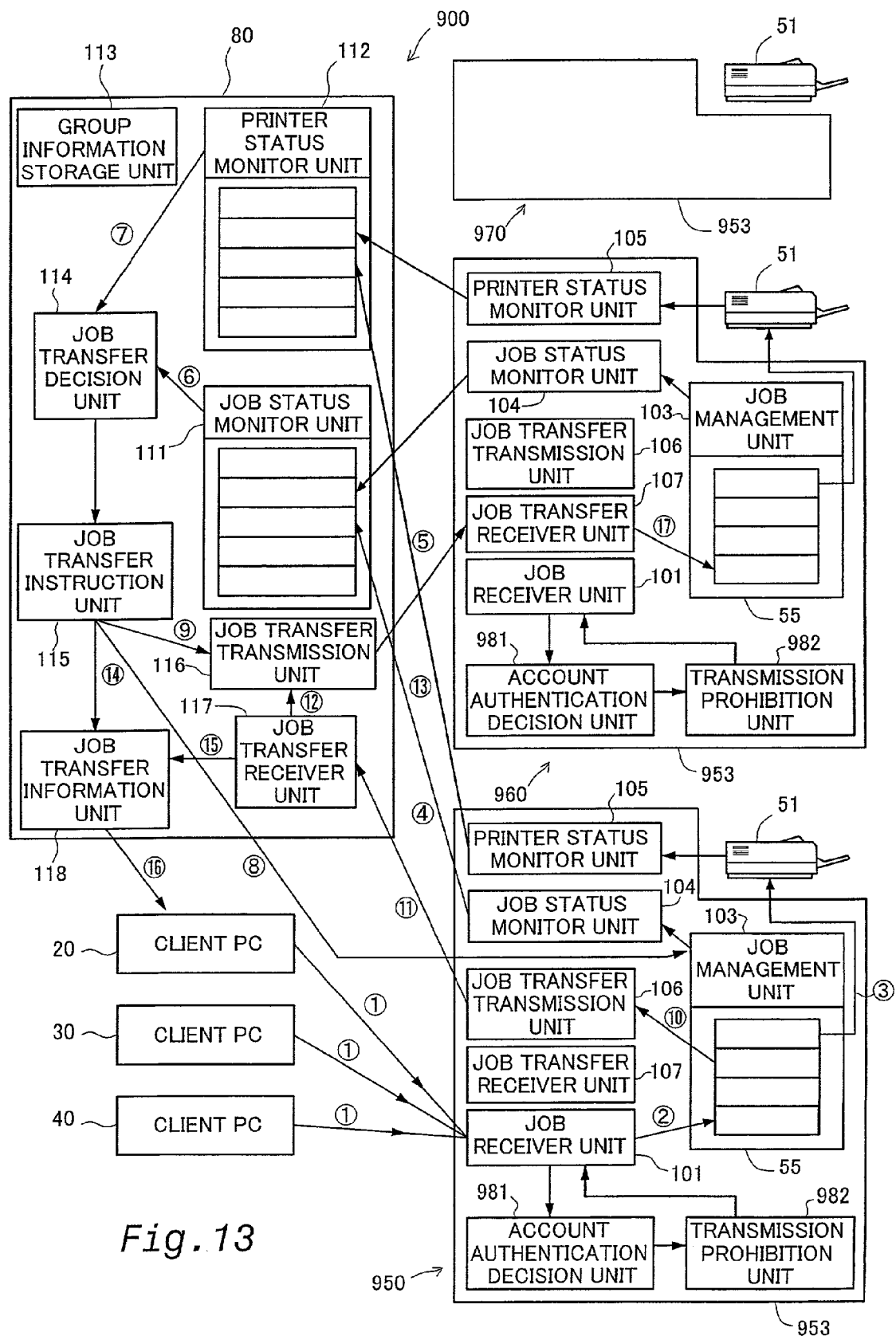
FIG. 13 schematically illustrates the configuration of still another computer system in a third embodiment of the present invention.

The following describes a third embodiment of the present invention. FIG. 13 schematically illustrates the configuration of a computer system in the third embodiment of the present invention. A computer system 900 has a similar configuration to that of the computer system 10 of the first embodiment, except some differences discussed below (Like numerals denote like elements).

In each printer control circuit 953 of printers 950, 960, and 970 included in the computer system 900 of the third embodiment, the job receiver unit 101 receives account attribute information in the process of receiving a print job from any of the client PCs 20, 30, and 40. An account authentication decision unit 981 carries out an account authentication decision process, based on the input account attribute information. The authentication decision process determines whether or not the print job has authority to use each of the printers 950, 960, and 970 included in the computer system 900, based on the presence or absence of the account in an account list provided in advance for the printers 950, 960, and 970. When it is determined that no authority is given, a transmission prohibition unit 982 prohibits the job receiver unit 101 from receiving the print job corresponding to the account.

The account list is stored in a non-illustrated account management device. The account authentication decision unit 981 may refer to the account management device for the presence of the account or may receive the account list for the authentication decision process according to the requirements.

The account authentication decision process is not performed for print jobs that are transferred from another printer and received by the job transfer receiver unit 107 as discussed in the first embodiment. The job receiver unit 101 and the job transfer receiver unit 107 are parted from each other by different port numbers for discriminating logic network channels, which are included in the packet structure of signals transmitted from the network.

The account authentication decision unit 981 and the transmission prohibition unit 982 are actualized by computer programs stored in advance in a ROM, which is constructed in the hardware configuration of the printer control circuit 953, and a variety of processing executed by a CPU according to the computer programs. In this embodiment, the computer programs have been stored in advance in the ROM. Like the first embodiment, however, the computer programs may be downloaded from external computer readable recording media via input-output interfaces and transferred to the RAM. In another application, the computer programs may be downloaded from a specific server connected to a computer network and be transferred to the RAM.

Figure 14:
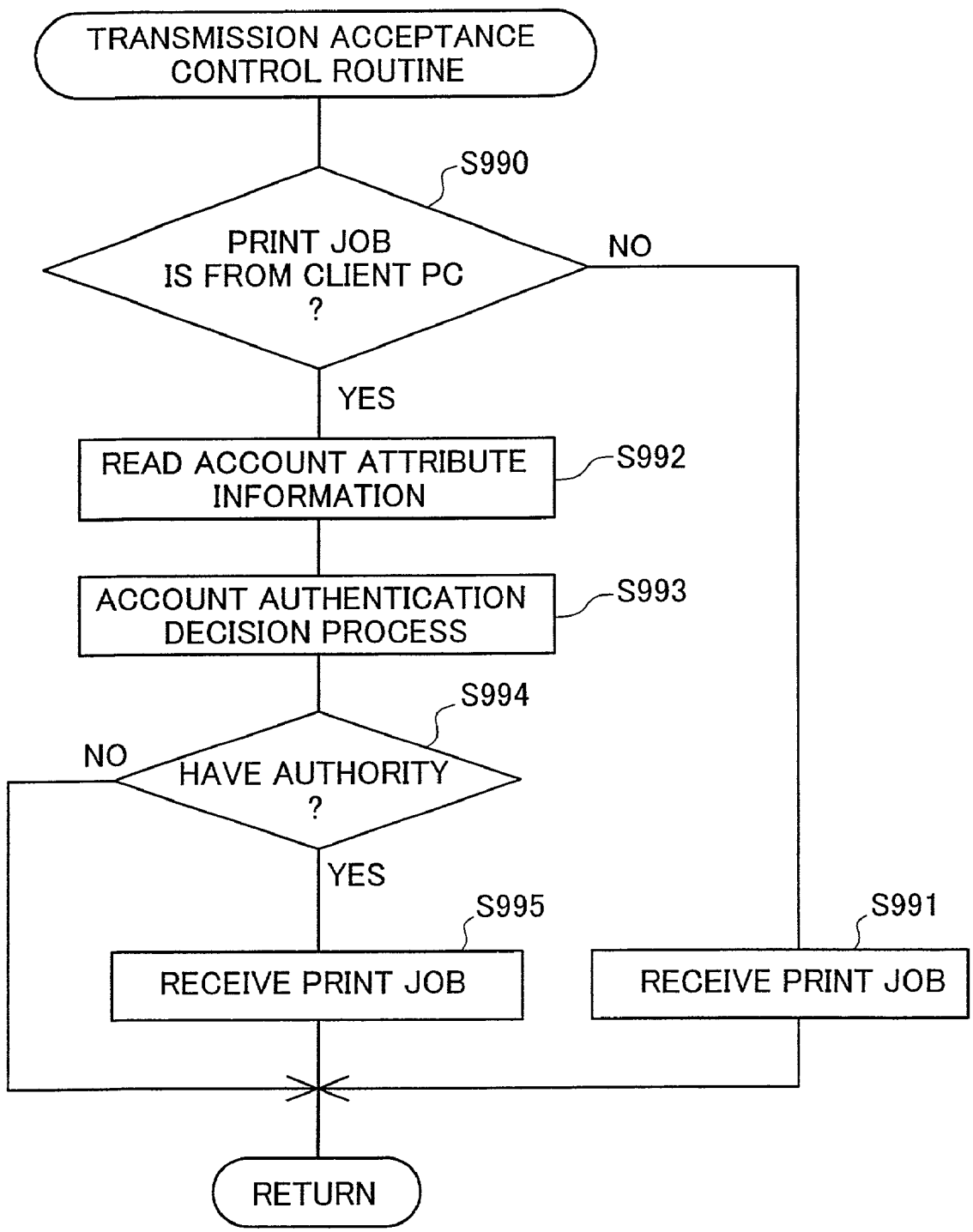
FIG. 14 is a flowchart showing a transmission acceptance control routine executed by a CPU in a printer control circuit 953.

The variety of processing routines described in such computer programs are executed in this embodiment. The CPU in the printer control circuit 953 executes a transmission acceptance control routine to actualize the account authentication decision unit 981 and the transmission prohibition unit 982. The transmission acceptance control routine starts in response to input of a print job into the printer control circuit 953. FIG. 14 is a flowchart showing the transmission acceptance control routine.

When the program enters this routine, the CPU in the printer control circuit 953 first determines whether an external print job has directly been sent from one of the client PCs 20, 30, and 40 or transferred from another printer (step S990). When it is determined that the external print job has not directly been sent from any of the client PCs 20, 30, and 40, the CPU just receives the print job (step S991) and goes to RETURN to exit from this processing routine. When it is determined that the external print job has not been transferred from another printer, on the other hand, the program follows a series of processing discussed below.

The CPU in the printer control circuit 953 reads the account attribute information input in the course of receiving the print job (step S992) and carries out the account authentication decision process, based on the input account attribute information (step S993). As described above, the authentication decision process determines whether or not the print job has the authority to use each of the printers 950, 960, and 970 included in the computer system 900, based on the presence or absence of the account in the account list provided in advance for the printers 950, 960, and 970. When it is determined at step S994 that the print job has the authority, the CPU receives the print job following the account attribute information (step S995), before exiting from this processing routine. When it is determined at step S994 that the print job has no authority, on the other hand, the CPU immediately exits from this processing routine without receiving the print job.

When one of the printers 950, 960, and 970 receives an external print job, the procedure of the third embodiment determines execution or non-execution of the account authentication decision process, based on whether the print job has directly been sent from one of the client PCs 20, 30, and 40 or has been transferred from another printer. The authentication decision process is skipped for the print job transferred from another printer, since it is expected that the authentication decision process has been performed at the time of transmission of the print job to another printer. This arrangement saves the time required for the authentication decision process, thus contributing to speed-up of distributive printing operations.

The transfer of the print job to the job transfer receiver unit 107 is performed via the logic network channel specified by the port number. A fixed port number may cause data transmitted with malicious intent not to be selected out but to be regarded as a normal print job. Such troubles can be avoided by dynamically and synchronously changing the port numbers assigned to the job transfer receiver unit 107 and the job transfer transmission unit 116.

In the configuration of the third embodiment, the job receiver unit 101 that receives the print job directly sent from the client PC and the job transfer receiver unit 107 that receives the print job transferred from another printer are constructed as separate elements as shown in FIG. 13. These two receiver units may be joined to one receiver unit, which determines whether the output source of the print job is one of the client PCs or another printer, based on the account attribute information attached to the print job. In the same manner as discussed in the third embodiment, when the output source is one of the client PCs, the processing of this modified construction carries out the account authentication decision process and prohibits the print job from being received in the case of no authority. This arrangement exerts the similar effects to those of the third embodiment.

The construction of the third embodiment adds the functions of the account authentication decision unit 981 and the transmission prohibition unit 982 to the configuration of the first embodiment. The functions of the account authentication decision unit 981 and the transmission prohibition unit 982 may alternatively be added to the configuration of the second embodiment.

In the first through the third embodiments discussed above, the printer having the printing mechanism 51 and the printer control circuit 53 with the spool buffer 55, which are incorporated in one casing, is applied for the printing apparatus of the present invention. Another construction of the printing apparatus includes a printer as the printing mechanism and a print server that is separate from the printer and has a spool buffer.

INDUSTRIAL APPLICABILITY

The principle of the present invention is applicable to a printing system that includes a diversity of printing apparatuses carrying out printing operations, such as printers, facsimiles, copying machines, and word processors, and a variety of information processing apparatuses outputting print jobs, such as computers.

The invention claimed is:

1. A printing system comprising a plurality of printing apparatuses, each having a printing mechanism and a buffer for spooling assigned to the printing mechanism, and at least one information processing apparatus outputting print jobs, which are connected mutually, each of the print jobs being sent from the information processing apparatus to the buffer included in any of the plurality of printing apparatuses and being printed by the printing mechanism by utilizing the spooling function of the printing apparatus, said printing system comprising:
   a source apparatus specification unit that specifies a source printing apparatus, which entrusts at least one print job stored in its own buffer to another printing apparatus, in a preset range of printing apparatuses; and
   a job transfer unit that itself automatically transfers the at least one print job stored in the buffer provided in the source printing apparatus specified by said source apparatus specification unit to the buffer of another printing apparatus in the preset range of printing apparatuses.

2. A printing system in accordance with claim 1, wherein said source apparatus specification unit comprises:
   a first information acquisition unit that obtains first information representing a congestion status of print jobs in the buffer of each printing apparatus, which is included in the preset range of printing apparatuses among the plurality of printing apparatuses; and
   a unit that detects a printing apparatus having a long queue of the print jobs based on the first information obtained by said first information acquisition unit, and specifies the detected printing apparatus as the source printing apparatus.

3. A printing system in accordance with claim 2, said printing system further comprising:
   a selection unit that selects a printing apparatus having a sufficiently short queue of print jobs in the preset range of printing apparatuses, based on the first information obtained by said first information acquisition unit,
   wherein said job transfer unit sets the printing apparatus selected by said selection unit to a destination of the transfer of the print job.

4. A printing system in accordance with claim 3, wherein said source apparatus specification unit comprises:
   a second information acquisition unit that obtains second information representing a status of the printing mechanism of each printing apparatus in the preset range of printing apparatuses; and
   a unit that detects a printing apparatus having the printing mechanism in an error status based on the second information obtained by said second information acquisition unit, and specifies the detected printing apparatus as the source printing apparatus.

5. A printing system in accordance with claim 4, said printing system further comprising:
   a selection unit that selects a printing apparatus having the printing mechanism not in the error status in the preset range of printing apparatuses, based on the second information obtained by said second information acquisition unit,
   wherein said job transfer unit sets the printing apparatus selected by said selection unit to a destination of the transfer of the print job.

6. A printing system in accordance with claim 2, wherein the first information acquisition unit continuously obtains said first information.

7. A printing system in accordance with claim 1, wherein said source apparatus specification unit comprises:
   a second information acquisition unit that obtains second information representing a status of the printing mechanism of each printing apparatus in the preset range of printing apparatuses; and
   a unit that detects a printing apparatus having the printing mechanism in an error status based on the second information obtained by said second information acquisition unit, and specifies the detected printing apparatus as the source printing apparatus.

8. A printing system in accordance with claim 7, said printing system further comprising:
   a selection unit that selects a printing apparatus having the printing mechanism not in the error status in the preset range of printing apparatuses, based on the second information obtained by said second information acquisition unit,
   wherein said job transfer unit sets the printing apparatus selected by said selection unit to a destination of the transfer of the print job.

9. A printing system in accordance with claim 1, wherein each print job output from the information processing apparatus comprises first label data representing whether or not the print job is a possible candidate for the transfer by said job transfer unit, and
   said job transfer unit comprises a transfer prohibition unit that prohibits the transfer of a print job that has been determined not to be a possible candidate for the transfer based on the first label data.

10. A printing system in accordance with claim 9, wherein each print job output from the information processing apparatus comprises second label data representing a priority order of printing by the spooling function, and
    said job transfer unit selects the at least one print job to be transferred, based on the second label data.

11. A printing system in accordance with claim 1, said printing system further comprising:
    a job transfer information unit that informs the information processing apparatus, which is the output source of the at least one print job to be transferred by said job transfer unit, of the another printing apparatus specified as a destination of the transfer of the print job.

12. A printing system comprising a plurality of apparatus groups, each apparatus group comprising a plurality of printing apparatuses, each having a printing mechanism and a buffer for spooling assigned to the printing mechanism, and at least one information processing apparatus outputting print jobs, which are connected mutually, each of the print jobs being sent from the information processing apparatus to the buffer included in any of the plurality of printing apparatuses and being printed by the printing mechanism by utilizing the spooling function of the printing apparatus, said printing system comprising:

a source apparatus specification unit that specifies a source printing apparatus, which entrusts at least one print job stored in its own buffer to another printing apparatus, in a range of one certain apparatus group; and a job transfer unit that itself automatically transfers the at least one print job stored in the buffer provided in the source printing apparatus specified by said source apparatus specification unit to the buffer of another printing apparatus in a range of at least two apparatus groups, which includes at least the certain apparatus group to which the source printing apparatus belongs.

13. A printing system in accordance with claim 12, wherein said source apparatus specification unit comprises:

a first information acquisition unit that obtains first information representing a congestion status of print jobs in the buffer of each printing apparatus in the range of the certain apparatus group; and a unit that detects a printing apparatus having a long queue of the print jobs based on the first information obtained by said first information acquisition unit, and specifies the detected printing apparatus as the source printing apparatus.

14. A printing system in accordance with claim 13, said printing system further comprising:

a target apparatus group specification unit that specifies a plurality of target apparatus groups as potential destinations of the transfer by said job transfer unit;

an acquisition unit that obtains the first information in a range of the plurality of specified target apparatus groups; and a selection unit that selects a printing apparatus having a sufficiently short queue of print jobs in the range of the plurality of specified target apparatus groups, based on the first information obtained by said acquisition unit, wherein said job transfer unit sets the printing apparatus selected by said selection unit to a destination of the transfer of the print job.

15. A printing system in accordance with claim 14, wherein said source apparatus specification unit comprises:

a second information acquisition unit that obtains second information representing a status of the printing mechanism of each printing apparatus in the range of the certain apparatus group; and a unit that detects a printing apparatus having the printing mechanism in an error status based on the second information obtained by said second information acquisition unit, and specifies the detected printing apparatus as the source printing apparatus.

16. A printing system in accordance with claim 15, said printing system further comprising:

a target apparatus group specification unit that specifies a plurality of target apparatus groups as potential destinations of the transfer by said job transfer unit;

an acquisition unit that obtains the second information in a range of the plurality of specified target apparatus groups; and a selection unit that selects a printing apparatus having the printing mechanism not in the error status in the range of the plurality of specified target apparatus groups, based on the second information obtained by said acquisition unit, wherein said job transfer unit sets the printing apparatus selected by said selection unit to a destination of the transfer of the print job.

17. A printing system in accordance with claim 12, wherein said source apparatus specification unit comprises:

a second information acquisition unit that obtains second information representing a status of the printing mechanism of each printing apparatus in the range of the certain apparatus group; and a unit that detects a printing apparatus having the printing mechanism in an error status based on the second information obtained by said second information acquisition unit, and specifies the detected printing apparatus as the source printing apparatus.

18. A printing system in accordance with claim 17, said printing system further comprising:

a target apparatus group specification unit that specifies a plurality of target apparatus groups as potential destinations of the transfer by said job transfer unit;

an acquisition unit that obtains the second information in a range of the plurality of specified target apparatus groups; and a selection unit that selects a printing apparatus having the printing mechanism not in the error status in the range of the plurality of specified target apparatus groups, based on the second information obtained by said acquisition unit, wherein said job transfer unit sets the printing apparatus selected by said selection unit to a destination of the transfer of the print job.

19. A printing system in accordance with claim 12, said printing system further comprising:

a target apparatus group specification unit that specifies a plurality of target apparatus groups as potential destinations of the transfer by said job transfer unit;

a detection unit that detects an available printing apparatus as a possible candidate for destination of the transfer by the job transfer unit in each of the plurality of target apparatus groups specified;

a management unit that collects all the available printing apparatuses in the respective target apparatus groups detected by said detection unit and stores a result of the collection as management data; and a selection unit that selects one printing apparatus as a destination printing apparatus for the transfer by said job transfer unit, based on the management data.

20. A printing system in accordance with claim 19, wherein each of the plurality of target apparatus groups specified by said target apparatus group specification unit comprises said management unit, and specific data including at least the available printing apparatuses in the respective target apparatus groups detected by said detection unit are transmitted between the plurality of target apparatus groups specified by said target apparatus group specification unit, so that the total data is common to the plurality of target apparatus groups.

21. A printing system in accordance with claim 19, wherein said management unit is provided separately from the plurality of target apparatus groups specified by said target apparatus group specification unit and is actualized by a computer connected to each target apparatus group via communication.

22. A printing system in accordance with claim 1, wherein said each printing apparatus further comprises:
   a receiver unit that receives an external print job;
   an identification unit that carries out identification to determine whether or not the external print job received by said receiver unit has been sent via said job transfer unit; and
   a processing change unit that changes over a series of processing to be executed, based on a result of the identification by said identification unit.

23. A printing system in accordance with claim 22, wherein said each printing apparatus further comprises:
   an authentication unit that authenticates a source of transmission of the print job,
   wherein said processing change unit comprises a unit that switches over a working status of said authentication unit between execution and non-execution.

24. A printing system in accordance with claim 12, wherein said each printing apparatus further comprises:
   a receiver unit that receives an external print job;
   an identification unit that carries out identification to determine whether or not the external print job received by said receiver unit has been sent via said job transfer unit; and
   a processing change unit that changes over a series of processing to be executed, based on a result of the identification by said identification unit.

25. A printing system in accordance with claim 24, wherein said each printing apparatus further comprises:
   an authentication unit that authenticates a source of transmission of the print job,
   wherein said processing change unit comprises a unit that switches over a working status of said authentication unit between execution and non-execution.

26. A printing control method adopted in a printing system that comprises a plurality of printing apparatuses, each having a printing mechanism and a buffer for spooling assigned to the printing mechanism, and at least one information processing apparatus outputting print jobs, which are connected mutually, each of the print jobs being sent from the information processing apparatus to the buffer included in any of the plurality of printing apparatuses and being printed by the printing mechanism by utilizing the spooling function of the printing apparatus, said printing control method comprising the steps of:
   (a) specifying a source printing apparatus, which entrusts at least one print job stored in its own buffer to another printing apparatus, in a preset range of printing apparatuses; and
   (b) automatically transferring the at least one print job stored in the buffer provided in the source printing apparatus specified in said step (a) to the buffer of another printing apparatus in the preset range of printing apparatuses.

27. A printing control method in accordance with claim 26, wherein said step (a) comprises the steps of:
   (a-1) obtaining first information representing a congestion status of print jobs in the buffer of each printing apparatus, which is included in the preset range of printing apparatuses among the plurality of printing apparatuses; and
   (a-2) detecting a printing apparatus having a long queue of the print jobs based on the first information obtained in said step (a-1), and specifies the detected printing apparatus as the source printing apparatus.

28. A printing control method in accordance with claim 26, said printing control method further comprising the steps of:
   (c) receiving a print job in said each printing apparatus;
   (d) carrying out identification to determine whether or not the print job received in said step (c) has been sent via said step (b); and
   (e) changing over a series of processing to be executed, based on a result of the identification in said step (d).

29. A printing control method in accordance with claim 28, said printing control method further comprising the step of:
   (f) authenticating a source of transmission of the print job in said each printing apparatus,
   wherein said step (e) comprises the step of changing over a working status of said step (f) between execution and non-execution.

30. A printing control method adopted in a printing system that comprises a plurality of apparatus groups, each apparatus group comprising a plurality of printing apparatuses, each having a printing mechanism and a buffer for spooling assigned to the printing mechanism, and at least one information processing apparatus outputting print jobs, which are connected mutually, each of the print jobs being sent from the information processing apparatus to the buffer included in any of the plurality of printing apparatuses and being printed by the printing mechanism by utilizing the spooling function of the printing apparatus, said printing control method comprising the steps of:
   (a) specifying a source printing apparatus, which entrusts at least one print job stored in its own buffer to another printing apparatus, in a range of one certain apparatus group; and
   (b) automatically transferring the at least one print job stored in the buffer provided in the source printing apparatus specified in said step (a) to the buffer of another printing apparatus in a range of at least two apparatus groups, which includes at least the certain apparatus group to which the source printing apparatus belongs.

31. A printing control method in accordance with claim 30, wherein said step (a) comprises the steps of:
   (a-1) obtaining first information representing a congestion status of print jobs in the buffer of each printing apparatus in the range of the certain apparatus group; and
   (a-2) detecting a printing apparatus having a long queue of the print jobs based on the first information obtained in said step (a-1), and specifies the detected printing apparatus as the source printing apparatus.

32. A printing control method in accordance with claim 30, said printing control method further comprising the steps of:
   (c) receiving a print job in said each printing apparatus;
   (d) carrying out identification to determine whether or not the print job received in said step (c) has been sent via said step (b); and
   (e) changing over a series of processing to be executed, based on a result of the identification in said step (d).

33. A printing control method in accordance with claim 32, said printing control method further comprising the step of:
- (f) authenticating a source of transmission of the print job in said each printing apparatus,
  wherein said step (e) comprises the step of changing over a working status of said step (f) between execution and non-execution.

34. A computer readable recording medium in which a computer program is recorded, said computer program being adopted in a printing system that comprises a plurality of printing apparatuses, each having a printing mechanism and a buffer for spooling assigned to the printing mechanism, and at least one information processing apparatus outputting print jobs, which are connected mutually, each of the print jobs being sent from the information processing apparatus to the buffer included in any of the plurality of printing apparatuses and being printed by the printing mechanism by utilizing the spooling function of the printing apparatus, said computer program causing a computer to attain the functions of:
- (a) specifying a source printing apparatus, which entrusts at least one print job stored in its own buffer to another printing apparatus, in a preset range of printing apparatuses; and
- (b) automatically transferring the at least one print job stored in the buffer provided in the source printing apparatus specified by said function (a) to the buffer of another printing apparatus in the preset range of printing apparatuses.

35. A recording medium in accordance with claim 34, wherein said computer program further causes the computer to attain the functions of:
- (c) receiving a print job in said each printing apparatus;
- (d) carrying out identification to determine whether or not the print job received by said function (c) has been sent via said function (b); and
- (e) changing over a series of processing to be executed, based on a result of the identification by said function (d).

36. A computer readable recording medium in which a computer program is recorded, said computer program being adopted in a printing system that comprises a plurality of apparatus groups, each apparatus group comprising a plurality of printing apparatuses, each having a printing mechanism and a buffer for spooling assigned to the printing mechanism, and at least one information processing apparatus outputting print jobs, which are connected mutually, each of the print jobs being sent from the information processing apparatus to the buffer included in any of the plurality of printing apparatuses and being printed by the printing mechanism by utilizing the spooling function of the printing apparatus, said computer program causing a computer to attain the functions of:
- (a) specifying a source printing apparatus, which entrusts at least one print job stored in its own buffer to another printing apparatus, in a range of one certain apparatus group; and
- (b) automatically transferring the at least one print job stored in the buffer provided in the source printing apparatus specified by said function (a) to the buffer of another printing apparatus in a range of at least two apparatus groups, which includes at least the certain apparatus group to which the source printing apparatus belongs.

37. A recording medium in accordance with claim 36, wherein said computer program further causes the computer to attain the functions of:
- (c) receiving a print job in said each printing apparatus;
- (d) carrying out identification to determine whether or not the print job received by said function (c) has been sent via said function (b); and
- (e) changing over a series of processing to be executed, based on a result of the identification by said function (d).

* * * * *